(12) United States Patent
Matthiesen et al.

(10) Patent No.: US 10,679,312 B2
(45) Date of Patent: Jun. 9, 2020

(54) DYNAMIC AUTONOMOUS VEHICLE SERVICING AND MANAGEMENT

(71) Applicant: Lyft, Inc., San Francisco, CA (US)

(72) Inventors: Taggart Matthiesen, San Francisco, CA (US); Jody Kelman, San Francisco, CA (US)

(73) Assignee: Lyft Inc., San Francisco, CA (US)

( * ) Notice: Subject to any disclaimer, the term of this patent is extended or adjusted under 35 U.S.C. 154(b) by 0 days.

(21) Appl. No.: 15/496,913

(22) Filed: Apr. 25, 2017

(65) Prior Publication Data

US 2018/0308191 A1 Oct. 25, 2018

(51) Int. Cl.
| | | |
|---|---|---|
| *G06Q 50/30* | (2012.01) | |
| *G08G 1/00* | (2006.01) | |
| *G01C 21/34* | (2006.01) | |
| *G06Q 10/06* | (2012.01) | |

(52) U.S. Cl.
CPC ......... *G06Q 50/30* (2013.01); *G01C 21/3407* (2013.01); *G01C 21/3438* (2013.01); *G06Q 10/06315* (2013.01); *G08G 1/202* (2013.01)

(58) Field of Classification Search
CPC .............. G06C 50/30; G06C 10/06315; G01C 21/3407; G01C 21/3667; G05D 1/0287; G05D 1/0022; G05D 1/0088; G05D 1/12; G08G 1/202; G06Q 50/30; G06Q 10/06315; G06Q 20/12
USPC .................................................. 701/23, 26, 2
See application file for complete search history.

(56) References Cited

U.S. PATENT DOCUMENTS

| | | | | |
|---|---|---|---|---|
| 5,319,556 A | * | 6/1994 | Bessacini | F41G 7/228 114/238 |
| 6,154,152 A | * | 11/2000 | Ito | G01C 21/32 340/988 |
| 6,401,068 B1 | * | 6/2002 | Cherveny | G01C 21/26 704/272 |

(Continued)

FOREIGN PATENT DOCUMENTS

WO    WO2016209595 A1    12/2016

OTHER PUBLICATIONS

International Search Report and Written Opinion for International Application No. PCT/US2018/027851, dated Sep. 4, 2018.

*Primary Examiner* — Angelina Shudy
(74) *Attorney, Agent, or Firm* — Baker Botts L.L.P.

(57) ABSTRACT

Embodiments provide techniques for autonomous vehicle management. When a service request (e.g., ride request, maintenance request, idling request, etc.) is received, the service request may be matched with an appropriate service provider (e.g., an autonomous vehicle to a rider, a maintenance facility to an autonomous vehicle, etc.). An autonomous vehicle may be then be dispatched based on the service request. For example, the autonomous vehicle may be dispatched to a pickup location associated with a ride request. Similarly, the autonomous vehicle may be dispatched to a maintenance facility in response to receiving a maintenance request. The maintenance request may be triggered after applying one or more thresholds and/or rules to the autonomous ride data collected from the autonomous vehicle. As autonomous ride data is collected from various autonomous vehicles, it can be analyzed to determine traffic patterns, road conditions, or other data.

20 Claims, 14 Drawing Sheets

(56) References Cited

U.S. PATENT DOCUMENTS

| | | | | |
|---|---|---|---|---|
| 6,654,681 B1* | 11/2003 | Kiendl | | G01C 21/26 340/905 |
| 7,865,277 B1* | 1/2011 | Larson | | G05D 1/0206 114/221 A |
| 8,885,151 B1* | 11/2014 | Chatham | | G01S 17/42 356/4.07 |
| 8,942,920 B1* | 1/2015 | Davidson | | G01C 21/32 701/446 |
| 9,123,152 B1* | 9/2015 | Chatham | | G06T 17/005 |
| 9,494,439 B1* | 11/2016 | Ross | | G05D 1/0022 |
| 9,507,346 B1* | 11/2016 | Levinson | | G05D 1/0214 |
| 9,547,309 B2* | 1/2017 | Ross | | G05D 1/0027 |
| 9,557,183 B1* | 1/2017 | Ross | | G08G 1/096816 |
| 9,606,539 B1* | 3/2017 | Kentley | | G05D 1/0214 |
| 9,612,123 B1* | 4/2017 | Levinson | | G01C 21/32 |
| 9,616,773 B2* | 4/2017 | Bradley | | B60N 2/002 |
| 9,625,264 B1* | 4/2017 | Imanishi | | G01C 21/3638 |
| 9,632,502 B1* | 4/2017 | Levinson | | G05D 1/0027 |
| 9,734,455 B2* | 8/2017 | Levinson | | G05D 1/0088 |
| 9,754,490 B2* | 9/2017 | Kentley | | G06K 9/00805 |
| 9,769,616 B1* | 9/2017 | Pao | | H04W 4/023 |
| 9,810,540 B1* | 11/2017 | Chatham | | G01C 21/34 |
| 9,840,199 B2* | 12/2017 | Kitaura | | B60R 1/00 |
| 9,894,484 B1* | 2/2018 | Pao | | H04W 4/046 |
| 9,939,276 B2* | 4/2018 | Cui | | G01C 21/34 |
| 9,953,538 B1* | 4/2018 | Matthiesen | | G08G 1/166 |
| 9,959,512 B2* | 5/2018 | Camp | | G06Q 10/06311 |
| 9,976,863 B2* | 5/2018 | Dryjanski | | G01C 21/3438 |
| 10,394,243 B1* | 8/2019 | Ramezani | | G05D 1/0214 |
| 10,578,443 B2* | 3/2020 | Sullivan | | G06K 9/00805 |
| 2007/0005239 A1* | 1/2007 | Kirouchenaradje | | G01C 21/3632 701/533 |
| 2007/0052552 A1* | 3/2007 | Suzuki | | G01C 21/34 340/905 |
| 2007/0208505 A1* | 9/2007 | Fujimoto | | G01C 21/32 701/451 |
| 2008/0086262 A1* | 4/2008 | Asahara | | G01C 21/32 701/452 |
| 2011/0093194 A1* | 4/2011 | Paik | | G01C 21/32 701/532 |
| 2011/0234423 A1* | 9/2011 | Edwardson | | G08G 1/087 340/906 |
| 2014/0058661 A1* | 2/2014 | Choi | | G01C 21/32 701/428 |
| 2015/0185034 A1 | 7/2015 | Abhyanker | | |
| 2015/0241223 A1* | 8/2015 | Davidson | | G01C 21/32 701/532 |
| 2015/0339928 A1* | 11/2015 | Ramanujam | | G06Q 10/00 701/23 |
| 2016/0139594 A1* | 5/2016 | Okumura | | B60W 30/00 701/2 |
| 2016/0187140 A1* | 6/2016 | Clarke | | H04L 63/083 701/25 |
| 2016/0282126 A1* | 9/2016 | Watts | | G01C 21/206 |
| 2016/0325753 A1* | 11/2016 | Stein | | B60W 40/06 |
| 2016/0327404 A1* | 11/2016 | Israelsson | | H04W 4/029 |
| 2016/0334230 A1* | 11/2016 | Ross | | G05D 1/0088 |
| 2016/0334797 A1* | 11/2016 | Ross | | G05D 1/0027 |
| 2017/0010613 A1* | 1/2017 | Fukumoto | | G05D 1/0088 |
| 2017/0075358 A1* | 3/2017 | Zhang | | G06Q 10/06 |
| 2017/0083957 A1* | 3/2017 | Ross | | G05D 1/0088 |
| 2017/0086230 A1* | 3/2017 | Azevedo | | H04L 67/12 |
| 2017/0123421 A1* | 5/2017 | Kentley | | G01C 21/26 |
| 2017/0123422 A1* | 5/2017 | Kentley | | G05D 1/0088 |
| 2017/0124781 A1* | 5/2017 | Douillard | | B60Q 1/26 |
| 2017/0147959 A1* | 5/2017 | Sweeney | | G05D 1/0022 |
| 2017/0219360 A1* | 8/2017 | Cui | | G01C 21/32 |
| 2017/0247108 A1* | 8/2017 | Ljubuncic | | B64C 39/024 |
| 2017/0305546 A1* | 10/2017 | Ni | | G05D 1/10 |
| 2017/0336629 A1* | 11/2017 | Suzuki | | B60K 35/00 |
| 2018/0024568 A1* | 1/2018 | Fridman | | G06K 9/00798 |
| 2018/0033310 A1* | 2/2018 | Kentley-Klay | | G06K 9/00805 |
| 2018/0096445 A1* | 4/2018 | Eyler | | G06Q 50/30 |
| 2018/0136000 A1* | 5/2018 | Rasmusson, Jr. | | G01C 21/3638 |
| 2018/0136656 A1* | 5/2018 | Rasmusson, Jr. | | G05D 1/0088 |
| 2018/0137373 A1* | 5/2018 | Rasmusson, Jr. | | G06K 9/00791 |
| 2018/0188045 A1* | 7/2018 | Wheeler | | G01C 21/32 |
| 2018/0188731 A1* | 7/2018 | Matthiesen | | B60R 25/24 |
| 2018/0188736 A1* | 7/2018 | Jian | | G05D 1/0231 |
| 2018/0189713 A1* | 7/2018 | Matthiesen | | H04W 4/80 |
| 2018/0191863 A1* | 7/2018 | Matthiesen | | H04W 4/70 |
| 2018/0239828 A1* | 8/2018 | Lublinsky | | G06F 17/30867 |
| 2018/0240344 A1* | 8/2018 | Matthiesen | | G08G 1/166 |
| 2018/0283895 A1* | 10/2018 | Aikin | | G01C 21/3415 |
| 2019/0197798 A1* | 6/2019 | Abari | | G06N 20/00 |
| 2019/0287063 A1* | 9/2019 | Skaaksrud | | B25J 9/162 |

\* cited by examiner

DYNAMIC AUTONOMOUS VEHICLE SERVICING AND MANAGEMENT

BACKGROUND

Traditionally, transportation and related services have been provided by a human-operated vehicle. However, human operators may not choose to operate in an efficient manner. For example, human operators may not know of high demand areas, or demand trends, leading them to operate in lower demand areas. Additionally, human operators may prefer certain areas (such as areas close to home, areas to perform errands after rides, etc.) which may not lead to an efficient distribution of vehicles in a given region. Improvements in computer processing have led to increasing efforts to automate more of these services, using autonomous vehicles that do not require a human operator. The addition of autonomous vehicles to a transportation fleet also presents the problem of how to perform various activities autonomously that were previously performed by human drivers.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques, including systems and methods, of autonomous vehicle management, such as within a dynamic transportation matching system utilizing one or more vehicle types such as non-autonomous vehicles and autonomous vehicles. When a service request (e.g., ride request, maintenance request, idling request, etc.) is received, the service request may be matched with an appropriate service provider (e.g., an autonomous vehicle to a rider, a maintenance facility to an autonomous vehicle, etc.). An autonomous vehicle may then be dispatched based on the service request. For example, the autonomous vehicle may be dispatched to a pickup location associated with a ride request. Similarly, the autonomous vehicle may be dispatched to a maintenance facility in response to receiving a maintenance request. The maintenance request may be triggered after applying one or more thresholds and/or rules to the autonomous ride data collected from the autonomous vehicle. As autonomous ride data is collected from various autonomous vehicles, it can be analyzed to determine traffic patterns, road conditions, or other data.

In an embodiment, ride and/or other data related to utilization of non-autonomous vehicles in a dynamic transportation matching system may be used to define aspects of introducing autonomous vehicles into the dynamic transportation matching system. For example, ride data related to non-autonomous vehicles may be used to define various aspects of non-autonomous vehicles capabilities and limitations as non-autonomous vehicles are introduced into the dynamic transportation matching system. Certain routes identified in the non-autonomous vehicle data may be used to define acceptable routes for autonomous vehicles, as well as identifying routes current or previously serviced by non-autonomous vehicles that may be prioritized for non-autonomous vehicles due to various factors, such as cost (e.g., cost per mile, cost per passenger, etc.), supply and demand (e.g., under-served or over-served regions, routes, etc.), accessibility (e.g., average speed, street grades, accident data, traffic data, etc.), and the like. Data associated with non-autonomous vehicles in a dynamic transportation matching system may be utilized to generate routes that can be serviced by autonomous vehicles, rather than identify some number of potential routes by performing a full permutation of all routes in a geographic area with regard to criteria associated with non-autonomous vehicles.

Figure 1:
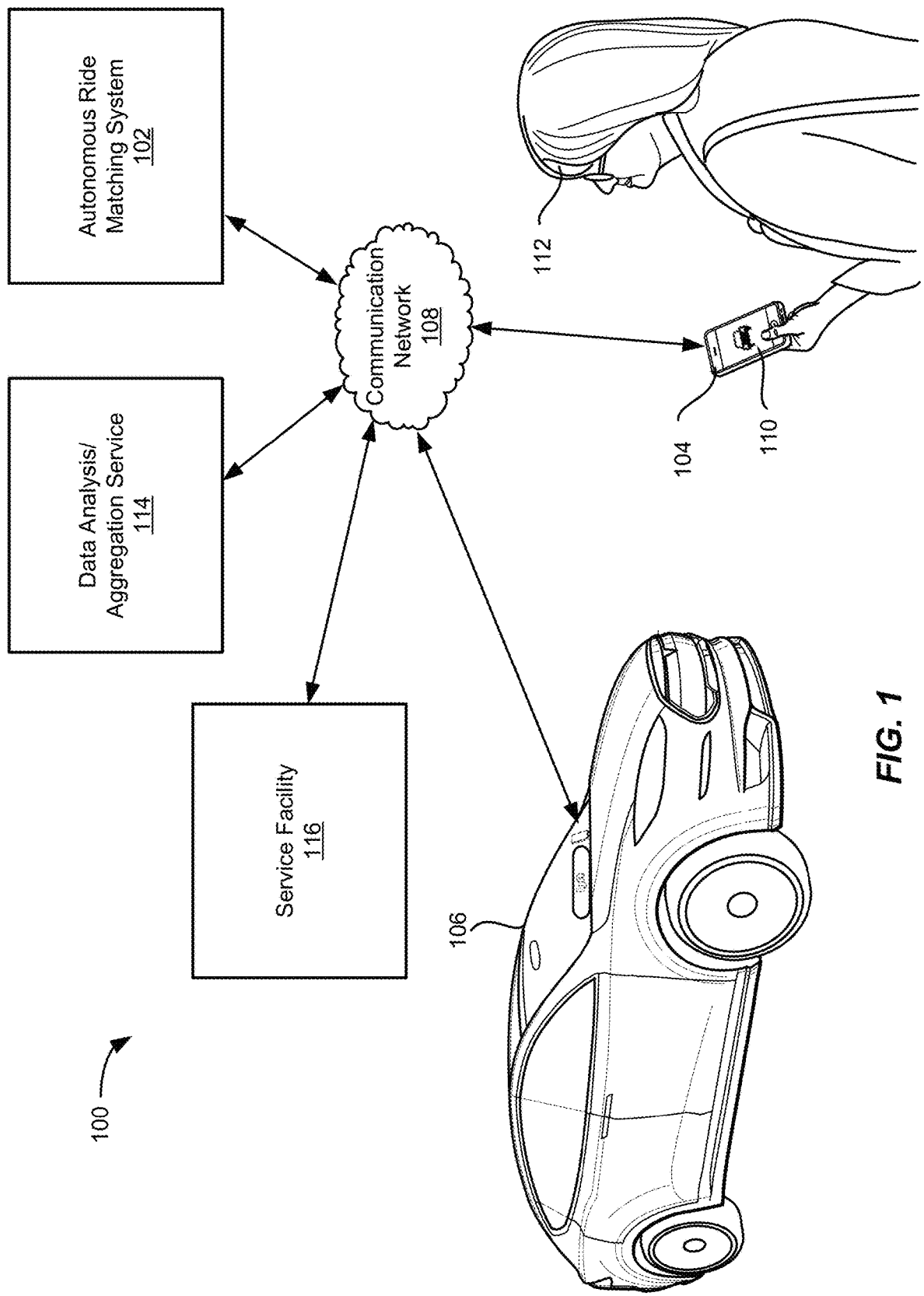
FIG. 1 illustrates an example of an autonomous ride matching system including a matched requestor and matched autonomous vehicle, in accordance with an embodiment.

FIG. 1 illustrates an example of an autonomous ride matching service 100 including a matched requestor and matched autonomous vehicle, in accordance with an embodiment. A autonomous ride matching system 102 may be configured to communicate with both the requestor computing device 104 and autonomous vehicle 106. In various embodiments, autonomous vehicle 106 may include a communications device integrated into the autonomous vehicle that is configured to communicate with autonomous ride matching system 102. Additionally, or alternatively, a separate computing device operable to communicate with both the autonomous ride matching system 102 and the autonomous vehicle 106 may be used to control the autonomous vehicle. A requestor 108 may use a ride matching requestor application 110 on a requestor computing device 104 to request a ride at a specified pick-up location. The request may be transmitted over a communication network 108 to the autonomous ride matching system 102. In some embodiments, autonomous ride matching system 102 may comprise a portion of a dynamic transportation matching system (e.g., by being a separate module in communication with the dynamic transportation matching system) that operates to match non-autonomous vehicles as well as autonomous vehicles to requests that operates to manage non-autonomous vehicles as well as autonomous vehicles, such as by matching non-autonomous vehicles as well as autonomous vehicles to requests. For example, depending on a requestor's pickup and/or drop-off locations, autonomous vehicles and non-autonomous vehicles may be available to complete the ride.

The autonomous ride matching system 102 may identify available autonomous vehicles that are within a predetermined distance and/or expected pickup time away from the requestor 112. The ride matching system 102 may send the ride request to autonomous vehicle 106 which may then proceed upon a route to the pickup location provided by requestor 108. The route may be determined by autonomous ride matching system 102, autonomous vehicle 106, or any combination thereof. As discussed further herein, autonomous vehicles may include various sensors that enable them to gather real-time information about road conditions, traffic patterns, vehicle status, etc. In some embodiments, between rides autonomous vehicles may be used to gather data along particular autonomous routes. This data may be sent from the autonomous vehicles to the autonomous ride matching system 102 over communication network 108. In some embodiments, all or a portion of this data may be made accessible to one or more data analysis/aggregation services 114. For example, traffic pattern data may be used by a municipality to improve the timing of traffic lights in different areas and/or at different times of day. Similarly, road condition data may be used to identify which roadways where maintenance may be prioritized.

In some embodiments, in addition to requests from requestors 112, service facilities 116 may also request an autonomous vehicle 106. For example, a gas station, charging station, a parking facility, a cleaning facility, or a maintenance facility may send a notification indicating availability at the facility. The facility may notify the autonomous ride matching system of available capacity to service vehicles. The autonomous ride matching system may then match vehicles for service as those vehicles require service. For example, autonomous ride matching system 102 may receive data from a vehicle sensor in autonomous vehicle 106 indicating that the autonomous vehicle requires service. Autonomous ride matching system 102 may then match the autonomous vehicle to a service facility 116 which has indicated it has available space and can perform the appropriate service for the autonomous vehicle. In some embodiments, vehicle sensors (e.g., weight sensors, moisture sensors, etc.), and/or in-vehicle cameras, and/or feedback submitted by the user, may be used to dispatch a vehicle to a cleaning facility. Different cleaning facilities may be capable of performing different cleaning services (e.g., wet cleans vs. dry cleans).

Figure 2:
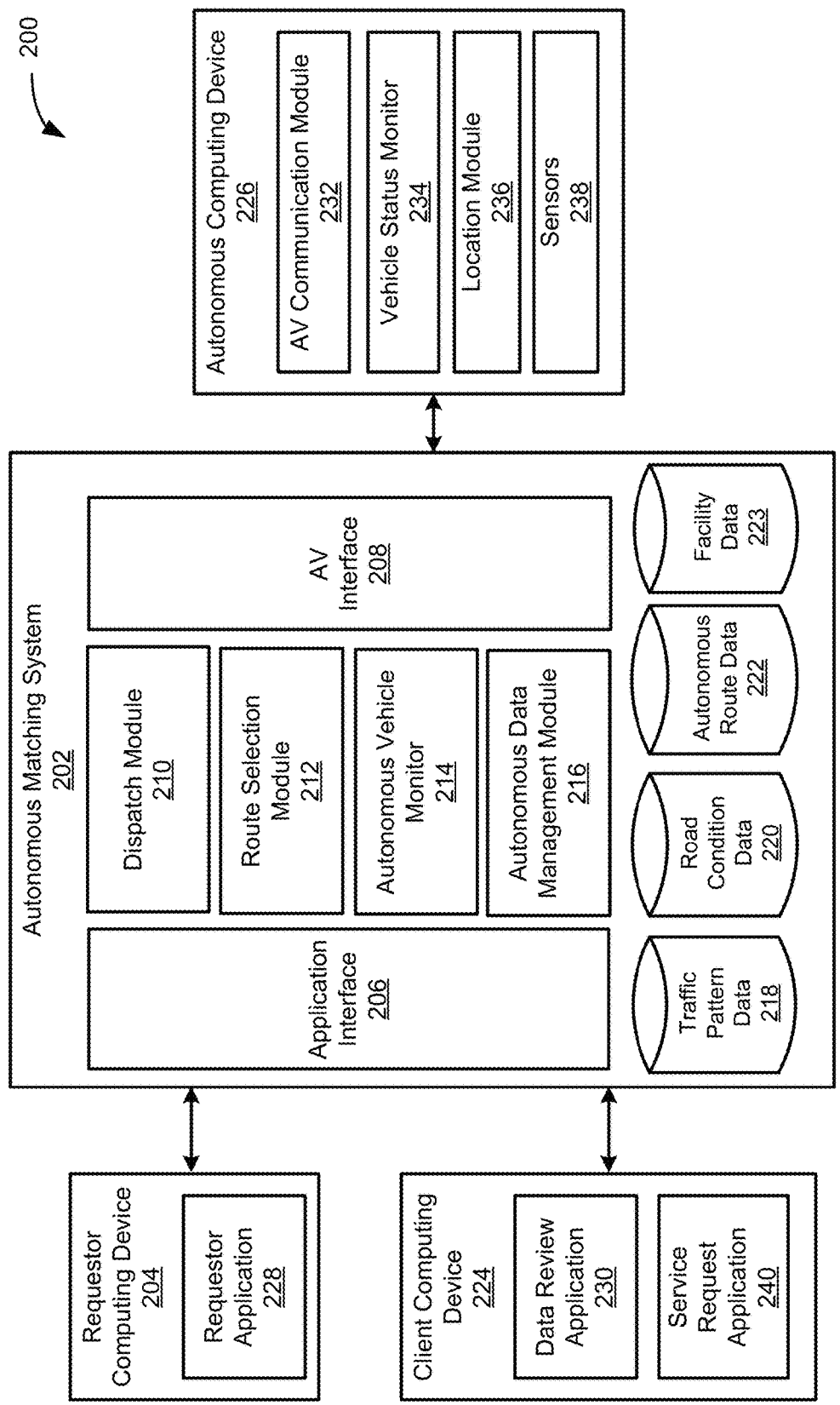
FIG. 2 illustrates an example block diagram of an autonomous ride system, in accordance with an embodiment.

FIG. 2 illustrates an example block diagram 200 of an autonomous ride system, in accordance with an embodiment. As described above, the autonomous matching system 202 may identify and facilitate request ride matching requestors received from requestor computing devices 204 with available providers, such as autonomous vehicles. The autonomous matching system 202 may include an application interface 206, an autonomous vehicle (AV) interface 208, a dispatch module 210, a route selection module 212, an autonomous vehicle monitor 214, and an autonomous data management module 216. The autonomous matching system 202 may also include a traffic pattern data store 218, a road condition data store 220, an autonomous route data store 222, and facility data store 223, each of which may be used by any of the modules of the autonomous matching system 202 to obtain information in order to perform the functionality of the corresponding module. The autonomous matching system 202 may be configured to communicate with a plurality of requestor computing devices 204, client computing devices 224, and autonomous computing devices 226 or other computing devices. Autonomous computing device 226 may be a computing device integrated with an autonomous vehicle, such as an in-vehicle computing device configured to control the autonomous vehicle. In some embodiments, autonomous computing device 226 may be a separate communications device configured to facilitate communication between the autonomous matching system 202 and an autonomous vehicle. Although the autonomous matching system 202 is shown in a single system, the autonomous matching system 202 may be hosted on multiple server computers and/or distributed across multiple systems. Additionally, the modules may be performed by any number of different computers and/or systems. Thus, the modules may be separated into multiple services and/or over multiple different systems to perform the functionality described herein.

The application interface 206 may include any software and/or hardware components configured to send and receive communications and/or other information between the autonomous matching system 202 and a plurality of requestor computing devices 204 and client computing device 224. The application interface 206 may be configured to facilitate communication between the autonomous matching system 202 and a requestor application 228 operating on a requestor computing device 204 and/or a data review application 230 on client computing device 224. In various embodiments, the requestor computing device 204 may represent a personal computing device of a user, used to request a ride service from autonomous matching system 202. Client computing device 224 may represented any computing device operable to access data maintained by autonomous matching system 202 and collected by autonomous computing device 226.

The application interface 206 may be configured to periodically receive ride requests, location information, a request location (also referred to as a "pick-up" location), a drop-off location, a ride type, autonomous vehicle operating instructions, autonomous ride information, and/or any other relevant information from the requestor computing device 204 when the requestor application 228 is active on the requestor computing device 204. A ride request may include a requestor identifier, location information for the requestor computing device 204, a pick-up location for the ride request, one or more drop-off locations, a pick-up time, and/or any other suitable information associated with providing a service to a requestor. The ride request may be sent in a single message or may include a series of messages. Additionally, the application interface 206 may be configured to send ride match messages, autonomous vehicle location information, travel routes, pick-up estimates, traffic information, requests for autonomous ride instructions, autonomous vehicle status information, updates/notifications, and/or any other relevant information to the requestor application 228 of the requestor computing device 204. In some embodiments, requestor application 228 may be configured to display one or more available routes to the requestor between the requestor's pickup location and drop-off location. The requestor may select one of the routes, causing a message indicating the selected route to be sent to autonomous matching system 202. Based on the selected route, dispatch module 210 can dispatch an autonomous vehicle to the pickup location with an instruction to follow the selected route. Route selection module 212 may then update autonomous route data store 222 to indicate when the route was last travelled by an autonomous vehicle.

In various embodiments, a requestor computing device 204 and/or client computing device 224 may include any computing device that is configured to communicate with autonomous matching system 202 and/or autonomous computing device 226 over one or more communication networks. The requestor computing device 204 and/or client computing device 224 may comprise a processor, a computer-readable memory, and communication hardware and/or software to allow the requestor computing device 204 and/or client computing device 224 to communicate over one or more communication networks. For example, a requestor computing device 204 and/or client computing device 224 may include a mobile phone, a tablet, a smart watch, a laptop computer, a desktop computer, and/or any other suitable device having a processor, memory, and communication hardware.

In some embodiments, requestor computing device 204 is configured to communicate with the autonomous matching system 202 in order to request a service. The requestor computing device 204 may include communication components that allow the requestor computing device to communicate over one or more communication networks to the autonomous matching system 202 and/or the autonomous computing device 226. In some embodiments, the requestor computing device 204 may communicate directly with autonomous computing device 226 For example, requestor computing device 204 may pair with autonomous computing device 226 over Bluetooth or other wireless communication system, to exchange information, provide ride instructions, receive ride information and updates, etc. The requestor computing device 204 may also include a location module to allow the requestor computing device 204 to determine its current location and/or position. For example, the location module may implement global positioning system (GPS), cellular communications triangulation, and/or any other suitable location-based techniques to determine the coordinates or location of the requestor computing device 204. The requestor computing device 204 may include a display 230 which may include any suitable components to create visible light. For example, the display may include LED arrays, a LCD display, a projector, and/or any other components that create visible light, pixels, and/or images. In various embodiments, the display may also operate as a touchscreen interface through which user inputs may be received to, e.g., provide pickup and drop-off locations, request to begin or end an autonomous ride, etc.

In some embodiments, AV interface 208 may include any software and/or hardware configured to send and receive communications and/or other information between the autonomous matching system 202 and a plurality of autonomous computing devices 226. The AV interface 208 may be configured to periodically receive location information, vehicle and/or ride status information, and/or any other relevant information from the autonomous computing device 226. Additionally, the AV interface 208 may be configured to send ride requests, requestor location information, pick-up locations, travel routes, pick-up estimates, traffic information, provider updates/notifications, autonomous vehicle operating instructions, and/or any other relevant information to the autonomous computing device 226.

In some embodiments, autonomous computing device 226 can be an in-vehicle computing device, such as any computing device that is configured to communicate with autonomous matching system 202 and/or requestor computing device 204 over one or more communication networks. The in-vehicle computing device may comprise a processor, a computer-readable memory, and communication hardware and/or software to allow the autonomous computing device 226 to communicate over one or more communication networks. In some embodiments, the autonomous computing device 226 can be integrated into the autonomous vehicle's computer system, such as a part of the autonomous vehicle's data processing and control system and made user accessible through a display or other user interface device built into the autonomous vehicle (e.g., in-dash, console, seatback, or other location). Additionally, or alternatively, the autonomous computing device 226 may include a mobile phone, a tablet, a smart watch, a laptop computer, a desktop computer, and/or any other suitable device having a processor, memory, and communication hardware.

In some embodiments, the autonomous computing device 226 may include an autonomous vehicle communication module 232 that is configured to manage communications with the autonomous matching system 202 and other autonomous computing devices. In various embodiments, AV communication module 232 can provide vehicle, location, and travel data to autonomous matching system 202. In some embodiments, an autonomous computing device 226 can connect directly to other nearby autonomous computing devices to share location and travel data. In some embodiments, the autonomous computing devices can form a mesh network to share travel data as well as network connections to access autonomous matching system 202. Travel data can be collected by vehicle status monitor 234, which can record information related to the utilization of the autonomous vehicle. In some embodiments, vehicle status monitor 234 can record one or more of the number of rides completed by the autonomous vehicle, the number of miles traveled, the time elapsed and other travel information since the autonomous vehicle last received maintenance. In some embodiments, vehicle maintenance codes, such as codes associated with a check engine light, oil pressure, oil level, gas level, etc. may also be recorded by vehicle status monitor 234. In some embodiments, vehicle information can be collected from the vehicle itself (e.g., via the controller area network (CAN)-bus) or from APIs provided by the vehicle manufacturer, which may send data directly to an in-car console or to the autonomous matching service. Location module 236 may implement global positioning system (GPS), cellular communications triangulation, and/or any other suitable location-based techniques to determine the coordinates or location of the requestor computing device autonomous computing device 226.

In some embodiments, autonomous computing device 226 can request service based on data recorded by vehicle status monitor 234. The request may be sent to autonomous matching system 202 which may notify a service facility. In some embodiments, a service facility may include a client computing device 224 including a service request application 240. The service request application 240 may notify the autonomous matching system 202 of availability, service type, etc. In various embodiments, service facilities may be specialized to perform specific service types (e.g., autonomous vehicle maintenance, vehicle maintenance, body repair, etc.). The autonomous ride matching system may then match an autonomous vehicle to the service facility. In some embodiments, facility data may be maintained in a facility data store 223. When a facility is matched to an autonomous vehicle, information relevant to that facility may be looked up in the facility data 223. For example, if an autonomous vehicle is matched to a parking facility, the location (e.g., latitude and longitude) of that facility, the size of the facility, and/or availability data may be retrieved from facility data 223. Similarly, facility data may be looked up for a charging, cleaning, and/or a maintenance facility, such as size, location, services provided, etc. For example, a charging facility may be associated with data describing the type of charging available (e.g., standard charger, fast charger, etc.) and type of charging station (e.g., manual or automatic). In some embodiments, charging facility data may also include typical charge times for different types of autonomous vehicles, how long a typical charge will last in different autonomous vehicles, and/or a charge history for vehicles that have used that charger. Similarly, a cleaning facility may be associated with data describing the types of cleaning services, and typical cleaning times. Parking facilities may be associated with typical parking availability at different times of day, parking locations, idle locations, maximum parking or idling times, etc. The autonomous vehicle may accept the request and navigate to the service facility. In some embodiments, the autonomous matching system 202 may identify the service facility based on one or more constraints, such as time of day, date, service requested, etc.

Sensors 238 may include one or more sensors, or sensor arrays, used to identify objects around the autonomous vehicle, as well as the roadway, lane, direction, location, and other objects and roadway conditions the autonomous vehicle may encounter. Sensors 238 may include electromagnetic sensors, including RADAR, LiDAR, infrared, ultraviolet, optical, and other sensors, acoustic sensors, position sensors, and other sensors. Sensors 238 may also include multi-axis accelerometers and/or gyroscopes, weight scales, moisture sensors, in-vehicle cameras, and other sensors configured to monitor the interior status, contents, and motion of the autonomous vehicle. For example, accelerometers may measure the motion of the autonomous vehicle's cabin as it travels on different roads. Roads in poorer condition, with more pot holes, uneven surfaces, roadway patches, etc. may lead to a rougher ride as measured by sensors 238. In some embodiments, scales may be used to monitor seats, floors, and other user-accessible areas of the autonomous vehicle's cabin and may detect whether the weight of the cabin has changed, indicating a potential lost item left behind by a passenger or a potential spill. The sensor data may be stored in traffic pattern data store 214 and road condition data store 216, for further analysis by client computing device 224. Although shown as distinct data stores, in various embodiments, traffic pattern data and road condition data, along with raw sensor data, location data, and/or any other type of data gathered by the autonomous ride matching system may be maintained in a single data store, such as an autonomous ride data store.

In some embodiments, dispatch module 210 may include a software module that is configured to process ride requests, ride responses, and other communications between requestors and providers of the autonomous matching system 202 to match a requestor and a provider for a requested service. For example, a ride request can be received from requestor computing device 204, the ride request can include a pickup and a drop-off location or locations. In some embodiments, dispatch module 210 can be configured to determine a dispatch type for a ride request based on criteria associated with the route and/or the requestor. For example, the ride request may be originating in an area not served by autonomous vehicles, or the requestor's account may be associated with preference data indicating that human-driven vehicles should be preferentially dispatched whenever possible. Dispatch module 210 may send an instruction to an autonomous computing device 226 associated with an autonomous vehicle to go to the pickup location based on the criteria associated with the route and/or requestor. In some embodiments, a particular route may be determined by route selection module 212. For example, route selection module 212 may identify one or more autonomous routes from autonomous route data 222 to use based on current traffic, weather, or other roadway conditions. Additionally, or alternatively, route selection module may be configured to select a default route for an autonomous vehicle based on how recently data was collected for that route.

In some embodiments, one or more autonomous routes may be defined in data store 222. These autonomous routes may be defined from designated pickup and drop-off locations in a given geographic area. If the pickup and drop-off locations received in the ride request are each within one or more threshold distances of the designated pickup and drop-off locations, the autonomous ride type may be presented as an option to the requestor. Additionally, or alternatively, autonomous regions may be defined in data store 222 for a given geographic region. Each autonomous region may be associated with mapping, driving, and/or roadway conditions that allow autonomous vehicles to navigate between most locations within the region.

In some embodiments, autonomous vehicle monitor 214 may request vehicle status information from each autonomous computing device 226. When an autonomous vehicle has completed a ride, autonomous vehicle monitor can determine whether the autonomous vehicle can be made available for additional rides or needs to be sent in for maintenance. For example, autonomous vehicle monitor 214 can maintain status thresholds and/or status rules. Status thresholds can be defined for various metrics collected by vehicle status monitor 234 including, but not limited to, driving time, number of rides, number of miles, etc. The vehicle status information received from vehicle status monitor 234 can be compared to the thresholds. If one or more metrics have exceeded a threshold, the autonomous vehicle can be routed to a maintenance location. Additionally, or alternatively, status rules may be defined for vehicle maintenance codes including, but not limited to, check engine codes, tire pressure codes, oil level codes, etc. If a maintenance code is sent from the vehicle status monitor 234, it can be compared to the status rules and, if it satisfies one of the rules, the autonomous vehicle can be routed to a maintenance location. For example, each maintenance code may be associated with a different value indicating whether the maintenance needs to be performed immediately or whether the maintenance can be deferred (e.g., "high," "medium," or "low;" a numerical 1-10, or other value). The autonomous ride matching system may determine maintenance needs across the current fleet of vehicles and determine whether to route the vehicle for maintenance. For example, if the current number of vehicles in maintenance is high, and the maintenance code is associated with a "low" value, the maintenance may be deferred until maintenance has been completed on other vehicles. In some embodiments, vehicle status monitor may also be configured to request cleaning services based on data collected by sensors 238. For example, if the sensors detect vehicle conditions indicating a cleaning issue, such as a spill, vehicle status monitor 234 may send a request to autonomous matching system 202 indicating that the autonomous vehicle requires cleaning. This request may include a cleaning type, such as wet cleaning or dry cleaning. Dispatch module 210 may determine a cleaning facility that provides the appropriate cleaning service and then may dispatch the autonomous vehicle to the cleaning facility.

In some embodiments, autonomous data management module 216 may request sensor and location data from each autonomous computing device 226. Autonomous data management module can correlate vehicle location and speed of each corresponding computing device 226 and store the data in traffic pattern data 218. In some embodiments, accelerometer data can be correlated with location data and stored in road condition data 220. In various embodiments, one or more data review applications 230 can access the traffic pattern data 218 and road condition data 220. In some embodiments, the traffic pattern data and/or road condition data can be mapped and visualized over time. As more data is received from autonomous computing devices 226 over time, the traffic pattern data and road condition data may vary, as patterns and conditions change. In some embodiments, recently collected data may be weighted relative to older collected data, causing recently detected changes to patterns or conditions to more quickly replace the patterns and conditions determined based on older data.

Figure 3:
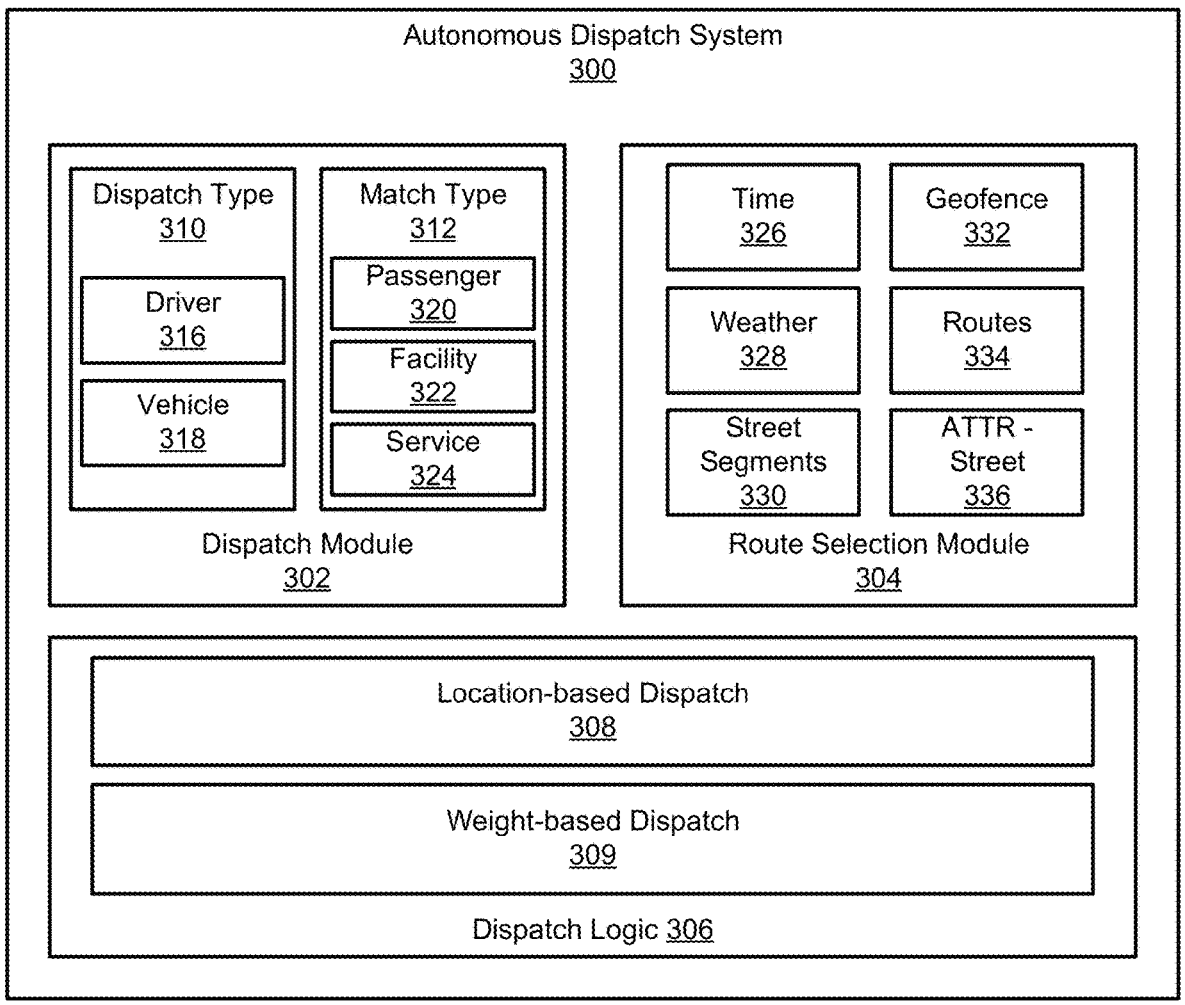
FIG. 3 illustrates an example block diagram of an autonomous dispatch system, in accordance with an embodiment.

FIG. 3 illustrates an example block diagram of an autonomous dispatch system 300, in accordance with an embodiment. In some embodiments a dispatch module 302 can match service providers to one or more services based on various constraints and/or rules managed by a route selection module 304. In various embodiments, route selection module 304 can include a mapping layer that can be used to determine when and where vehicles are available to make pickups and drop-offs.

Dispatch module 302 can include various dispatch types 310, such as drivers 316 (e.g., of non-autonomous vehicles) and autonomous vehicles 318. In some embodiments, the dispatch types may be extensible to include more or fewer service providers, such as different types of automobiles (e.g., trucks, vans, passenger vehicles, etc.) or different types of vehicles (e.g., aerial vehicles, watercraft, etc.). Each service provider that may be dispatched can be matched to one or more services. For example, match type 312 may include passengers 320, facilities 322 (e.g., gas stations, charging stations, or other service stations), or other services 324 (e.g., package or item delivery, emergency services, etc.). For example, if a vehicle is determined to be dirty or otherwise needs service, the vehicle can be matched to a facility that can perform the needed service. In some embodiments, dispatch module 302 can include a prefiltering module that is configured to determine the dispatch type for a ride request based on criteria associated with the route and/or the requestor. For example, the ride request may be originating in an area not served by autonomous vehicles, or the requestor's account may be associated with preference data indicating that human-driven vehicles should be preferentially dispatched whenever possible.

In some embodiments, route selection module 304 may include constraints and/or rules that may be used to determine available pickup and/or dispatchable zones. For example, some areas may only be accessible during particular times 326 or under certain weather conditions 328. In some embodiments, pickup zones may be defined by geofence data 332. The geofence data may be defined based on known pickup and drop-off zones, such as valet zones, loading zones, and parking lots. In some embodiments, the geofence data may include road conditions that make the area incompatible with autonomous vehicles, such as intersections that are too wide. In some embodiments, geofence data may be updated through interfacing with a geographic information system (GIS) maintained by a third party provider, such as a municipal or government GIS, a privately maintained GIS, or other public or private GID. In some embodiments, street segments 330 may be defined from which rides may be dispatched (e.g., street segments available for pickups, drop-offs, and/or driving routes to and from a pickup location and/or a drop-off location, etc.). The street segments may be activated/authorized selectively, allowing for rides (e.g., autonomous rides) to be enabled/disabled for particular street segments. In various embodiments, defined autonomous routes 334 and street attributes 336 may also be used to determine pickup and dispatch locations. For example, a particular street segment may be indicated as part of an authorized autonomous route (e.g., authorized to have an autonomous vehicle travel on a street segment associated with a pickup location, a drop-off location, and/or a route between an autonomous vehicle's current location and the pickup/drop-off location, as well as a route from the drop-off location to a autonomous vehicle parking area and/or maintenance facility).

Dispatch logic 306 may include various dispatch methods. For example, location-based dispatch 308 may optimize dispatches based on requestor and provider locations. In some embodiments, a weight-based dispatch 309 may assign custom weights to one or more factors related to a ride match. For example, factors may be weighted to increase utilization, such that shorter rides in busier areas may be preferentially matched over longer rides through less busy areas. In some embodiments, weights may be determined based on one or more dimensions being optimized. For example, weights may be associated with dispatch costs and an expected value of the ride. In some embodiments, the weight may be based on the likelihood that a given ride will position the vehicle for its next ride, e.g., based on the probability that the drop-off location at the drop-off time will yield a new ride request. Alternatively, a weighting for the mileage cost associated with repositioning the vehicle following the ride may be assigned. In various embodiments, dispatch cost may be a function of one or more of mileage associated with the ride, and the cost per mile (e.g., vehicle depreciation, vehicle maintenance, and vehicle insurance). Weightings may be similarly calculated to optimize dispatch along other dimensions, such as ETA-based dispatch (e.g., a strict threshold on a maximum length to the ride); passenger preferential dispatch (e.g., if limited supply of vehicles, preferentially dispatch autonomous vehicles to customers); facility-sensitive dispatch (e.g., dispatch rides that take into account the location of a nearby charging point at the end of the ride, or maintenance facility).

In some embodiments, autonomous dispatch system 300 may interface with a viewing layer and/or a tracking layer. The viewing layer can display the real-time movements of the autonomous fleet at any point in time and visually represent each vehicle in the autonomous fleet and display information related to each vehicle, such as vehicle state. In some embodiments, the autonomous fleet can be shown on a map of a particular region. Different regions may be accessed via a URL or other address identifier. In some embodiments, a user accessing the viewing layer may indicate pickup zones and dispatchable zones, along with the movement of vehicles and their state (e.g., available, accepted, picked up, in service, in distress, etc.).

In various embodiments, this visualization interface acts as an early warning system. For example, if current dispatch systems are malfunctioning, this may be recognizable visually based on the state and/or position of vehicles in the fleet (e.g., if a large number of vehicles are queuing at a charging station). Similarly, vehicle supply (e.g., deployed fleet size) and facility supply (e.g., service stations, charging stations, etc.) may be monitored and adjusted visually. In some embodiments, visualizations of the metrics may be provided. The metrics may be visualized over pre-defined periods (e.g., 1 hour, 1 day, 1 week, 1 month, 1 quarter, and 1 year). In some embodiments, the viewing layer may be configured to show all vehicles in a given fleet, including driven and autonomous vehicles. In some embodiments, it may be limited to showing autonomous vehicles.

In some embodiments, a tracking layer can be used to document aspects associated with autonomous vehicle rides and an impact of those rides. For example, a tracking layer may be selected in order to view statistics associated with the autonomous dispatch system, while in an embodiment the tracking layer may be coordinated with the visualization layer in order to display subsets of statistics, such as those associated with a selected portion of the viewing layer (e.g., a particular vehicle). Various metrics may be collected, including a number of rides, a number of hours associated with rides, a number of miles accumulated with one or more vehicles (e.g., miles driven during rides, miles driven with or without passengers, etc.), a number of incidents associated with one or more vehicles, a type of incident associated with one or more particular incidents, a metric corresponding to a number/type/severity of incident per unit (e.g., per mile, per hour, per dollar in ride revenue, etc.), gallons of gas saved, congestion hours saved, etc.

Figure 4:
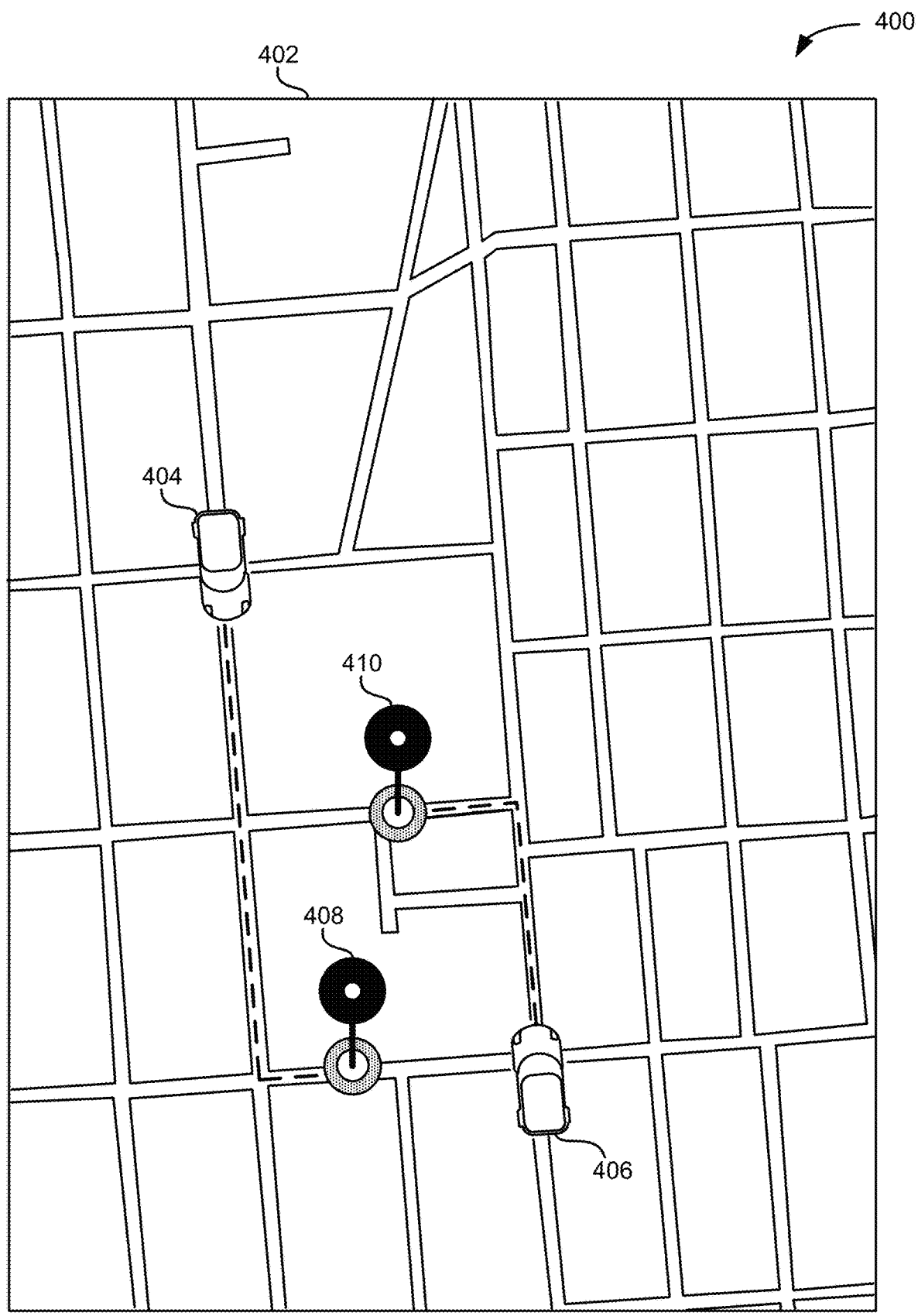
FIG. 4 illustrates an example of autonomous vehicles arriving at their destinations, in accordance with an embodiment.

FIG. 4 illustrates an example 400 of autonomous vehicles arriving at their destinations, in accordance with an embodiment. As shown in FIG. 4, within a given geographic area 402, autonomous vehicles 404 and 406 may complete their respective rides at drop-off locations 408 and 410, respectively. For example, geographic area 402 may represent an autonomous pickup/drop-off area that is defined by the autonomous ride matching system. As discussed, during the autonomous ride, sensors in each autonomous vehicle may be measuring, for example, travel time, travel distance, traffic information, road condition information, etc. This data may be uploaded to the autonomous ride matching system where it may be stored and analyzed, or stored and made available to third parties for further analysis. When the ride is complete, the autonomous vehicles can perform various actions depending on the status of the vehicle, current demand for autonomous rides, vehicle location, etc. However, were the autonomous vehicles to remain at the drop-off locations 408, 410, these would represent idle resources. Additionally, in many urban areas, stopping a vehicle on a street is not practical for any length of time. Accordingly, the autonomous vehicles can be more productive for both future rides and data collection purposes if they continue to travel one or more routes until a new ride request or other instruction is received.

Figure 5:
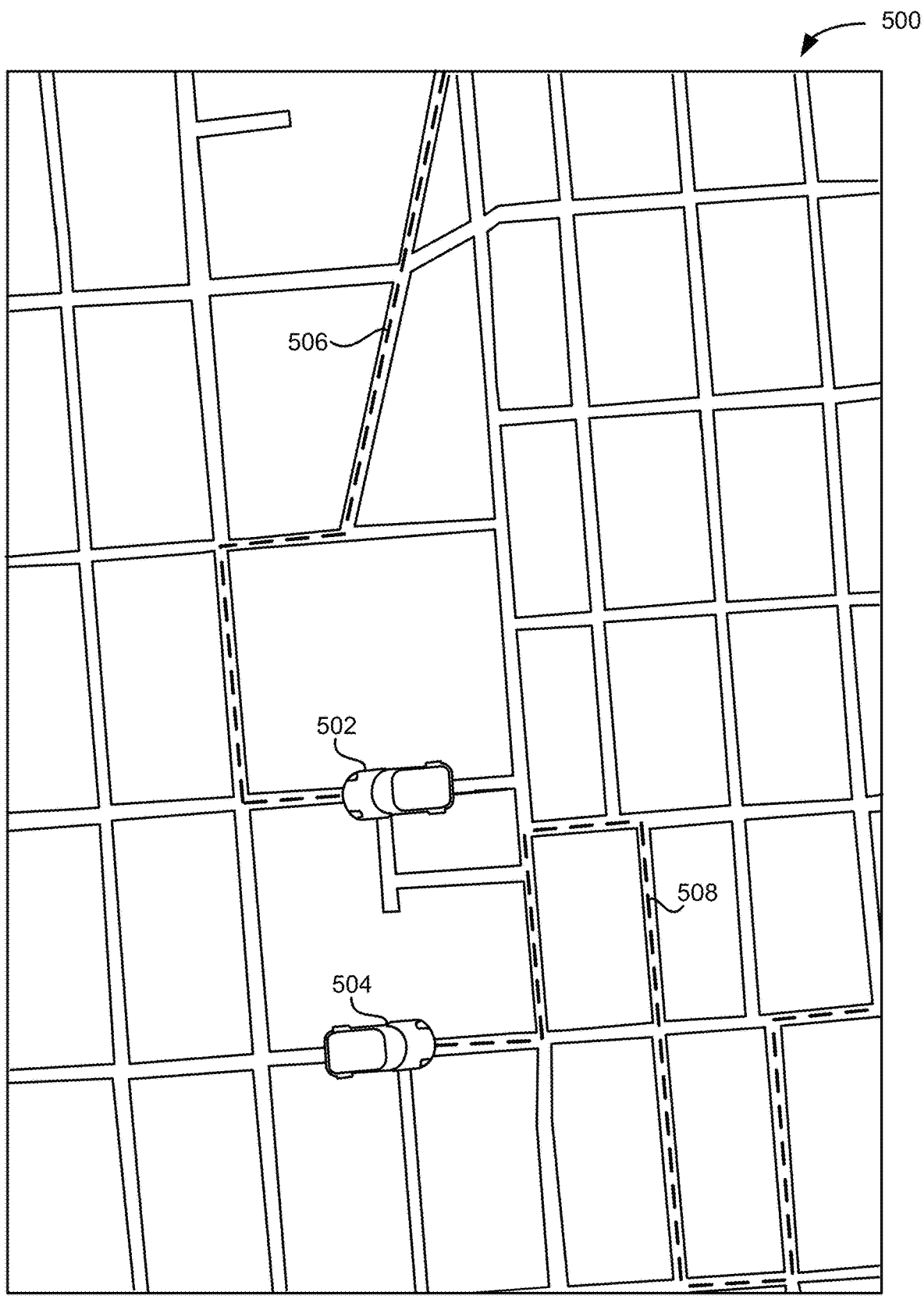
FIG. 5 illustrates example of autonomous vehicles beginning to travel newly assigned routes, in accordance with an embodiment.

FIG. 5 illustrates example 500 of autonomous vehicles beginning to travel newly assigned routes, in accordance with an embodiment. The example shown in FIG. 5 shows autonomous vehicle activity following the drop-offs described above with respect to FIG. 3. As shown, autonomous vehicles 502 and 504 have completed their autonomous rides. As discussed, when an autonomous ride is completed, the autonomous vehicles can send a message to the autonomous ride matching system that indicates the autonomous vehicle is available for a new ride or instruction. The message can include an autonomous vehicle identifier, location, and/or vehicle status information. As discussed, the vehicle status information can include usage data, such as number of rides, number of miles, amount of time, tire pressure variations, fluid levels (e.g., oil, gas, transmission fluid, etc.), battery charge level, number of ignition activations, tire tread levels, noise levels inside a passenger compartment, brake pad wear, etc., since the vehicle last received maintenance. The autonomous ride matching system can then determine based on the information received in the request, an instruction to send to the autonomous vehicle. For example, the current location may not be in demand for autonomous pickups. The autonomous ride matching system can determine that autonomous vehicle 502 is still available for a number of rides greater than a threshold number (e.g., based on the current status of the autonomous vehicle). Accordingly, autonomous vehicle 502 may be instructed to follow route 506 to a higher demand area and/or to a specific pickup location for a new ride. The autonomous ride matching system may also determine that autonomous vehicle 504 needs maintenance, e.g., based on the number of rides, miles, or other metric accumulated by autonomous vehicle 504 since its last maintenance. As shown in FIG. 5, autonomous vehicle 504 can be instructed to return to a maintenance area by route 508. As shown, route 508 is more circuitous, traveling up and down several blocks. This allows autonomous vehicle 508 to gather additional data for these areas than otherwise might be gathered. In both examples, the routes may be determined by a route selection module, as discussed above, based on how recently data has been collected by an autonomous vehicle for those routes.

Figure 6:
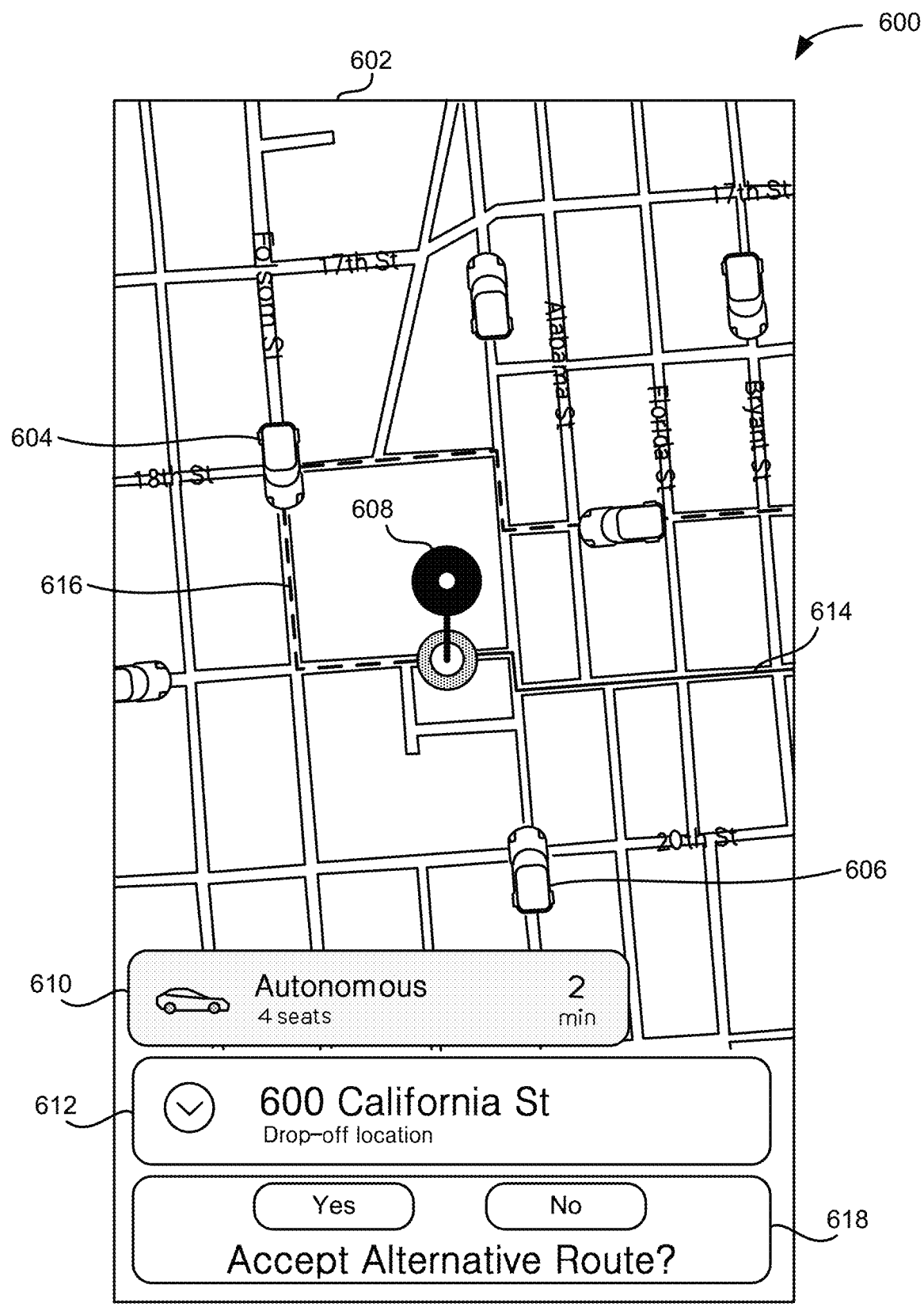
FIG. 6 illustrates an example of a graphical user interface for presenting an alternative route, in accordance with an embodiment.

FIG. 6 illustrates an example of a graphical user interface 600 for presenting an alternative route, in accordance with an embodiment. As shown in FIG. 6, a ride request graphical user interface (GUI) 602 can show a map of an area where the requestor is located. The map may include icons, such as vehicles 604 and 606, representing available vehicles in the area. Each icon may be located on the map at a location corresponding to an approximate real time location of the corresponding vehicle. In some embodiments, the requestor's location may be determined using information received from a location module, such as a GPS unit or similar device, in the requestor's device. A requestor can place pin 608 on the map to a requested pickup location and request a vehicle. As shown in FIG. 6, the requestor has requested 610 an autonomous vehicle which is arriving in approximately 2 minutes. In some embodiments, a drop-off location 612 can be provided by the requestor when the autonomous ride is requested. Using the pickup location and drop-off location, one or more routes can be identified. For example, a default route 614, corresponding to the fastest route based on current conditions, and an alternative route 616, may both be presented in GUI 602. The alternative route may include routes or portions of routes that are less commonly traveled, due to road conditions, traffic patterns, etc. As such, data may be gathered for the alternative route 616 less frequently than the default route 614, leading to less frequently sampled and less reliable data for the alternative route and nearby areas. In some embodiments, expected travel time and other ride information related to the alternative route may be presented. The requestor may accept or reject the alternative route using GUI element 618. In some embodiments, the autonomous vehicle dispatched to pick up the requestor may vary depending on the selected route. For example, autonomous vehicle 604 may be dispatched to pick up the requestor if the default route 614 is selected, and autonomous vehicle 606 may be dispatched if the alternative route 616 is selected. The autonomous vehicle that is dispatched may be selected based on current travel direction, route direction, arrival time, and other factors to reduce overall travel time for the selected route. Although two routes are shown in FIG. 6, this is for simplicity of explanation only. More routes may also be shown in GUI 602 or may be requested to be shown. For example, a selectable GUI icon may be displayed which, when selected, may cause a route selection module to determine additional routes to be presented in GUI 602.

Figure 7:
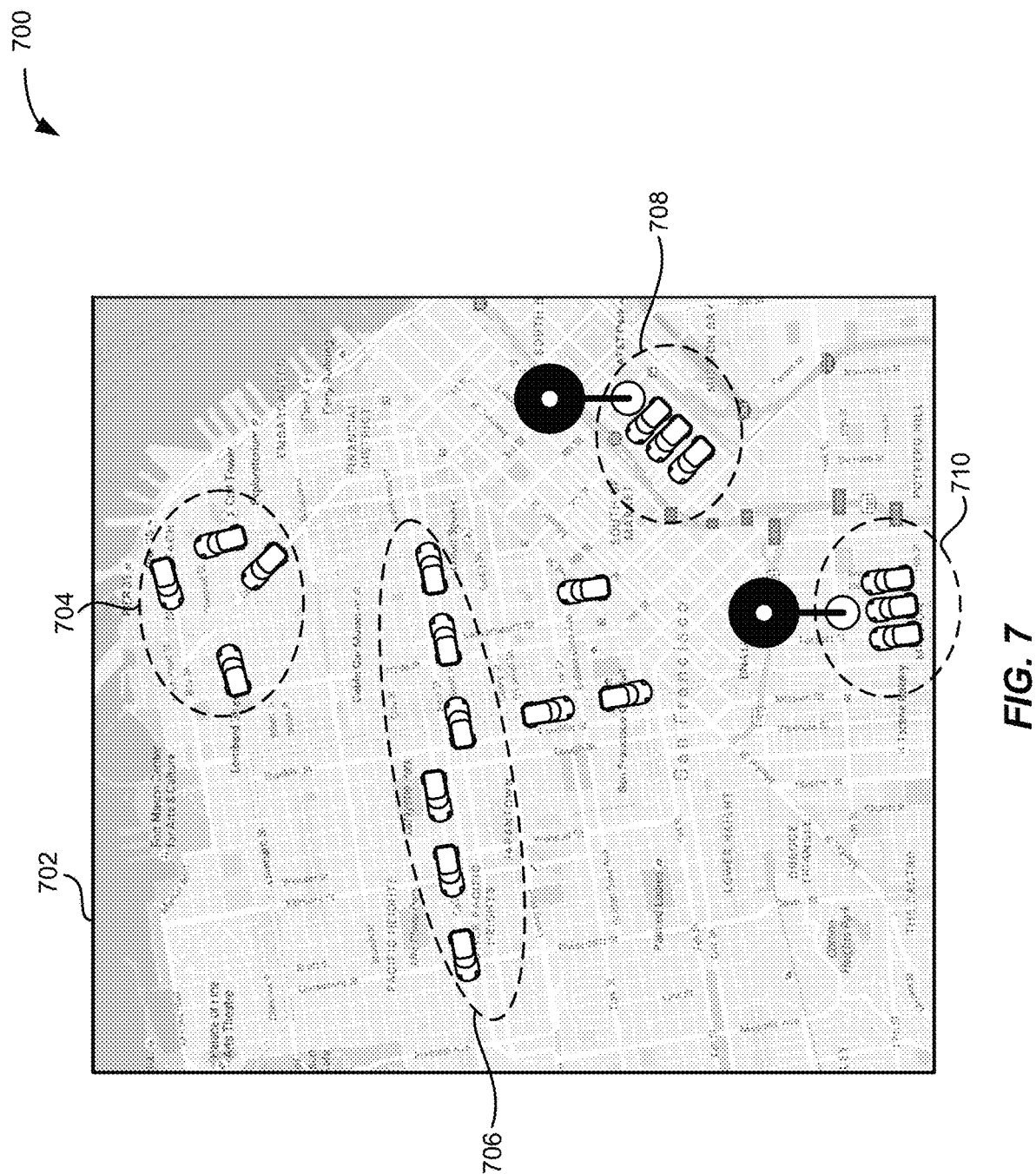
FIG. 7 illustrates an example of various autonomous vehicle inter-ride states, in accordance with an embodiment.

FIG. 7 illustrates an example 700 of various autonomous vehicle inter-ride states, in accordance with an embodiment. As discussed, between rides autonomous vehicles may receive various instructions to improve utilization of the autonomous vehicles when they are not actively providing ride services. As shown in FIG. 7, within a given geographic area 702, autonomous vehicles may receive different instructions depending on their location, status, time of day, demand, etc. In some embodiments, autonomous vehicles within a high demand area 704 may be instructed to drive between high demand pickup locations. Similarly, depending on time of day, autonomous vehicles may be instructed to follow commuting routes 706. As discussed, these routes may be defined by the autonomous ride matching system based on historical data and real-time data, such as data gathered from current and prior journeys of non-autonomous vehicles. In some embodiments, autonomous vehicles may be sent to and retrieved from various facilities or parking/idling locations 708, 710. For example, a parking area 708 may be defined near event locations, such as stadiums, arenas, conference centers, etc. Such a holding area may be defined relative to scheduled events, and may otherwise not be in use. In some embodiments, a service facility 710 may serve as a maintenance area. After an autonomous vehicle has been in use for a particular period of time, has logged a particular number or miles and/or rides, or other usage metric, the autonomous vehicle can be sent for maintenance at such a service facility. As discussed, the particular route an autonomous vehicle is assigned to any of these locations may be selected based on data collection frequency, estimated travel time, demand, etc.

Figure 8:
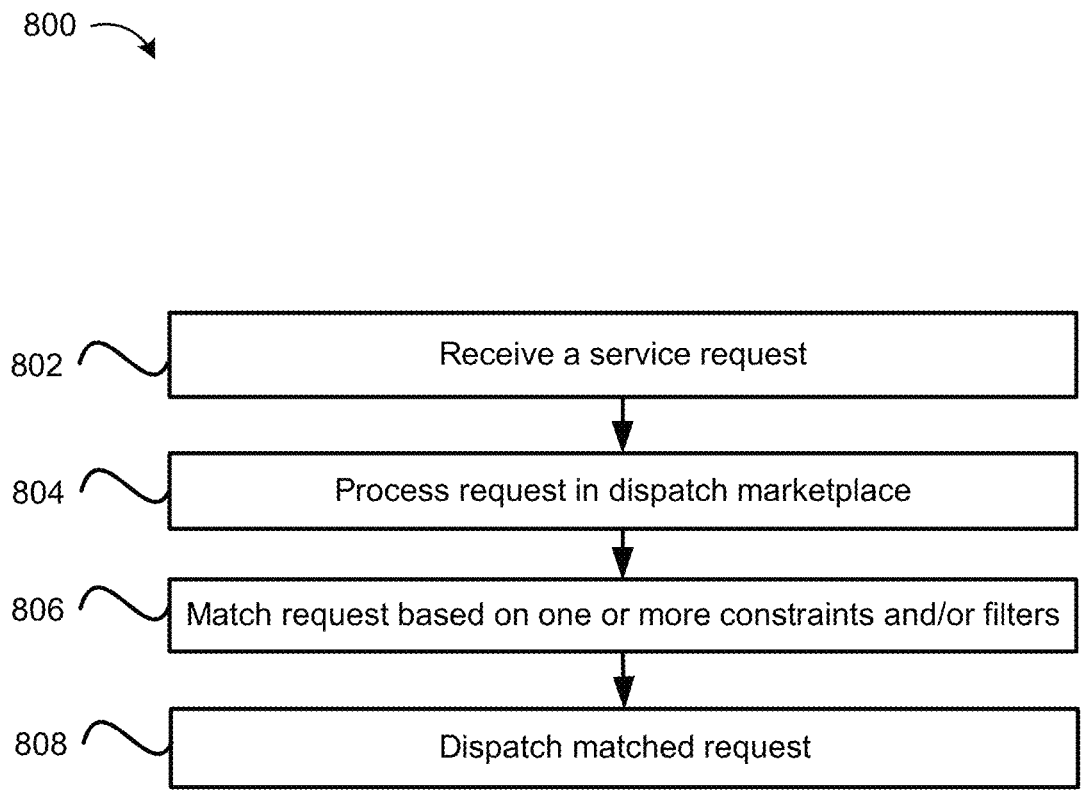
FIG. 8 illustrates an exemplary flow diagram of a method of vehicle dispatch using a marketplace, in accordance with an embodiment.

FIG. 8 illustrates an exemplary flow diagram of a method 800 of vehicle dispatch using a marketplace, in accordance with an embodiment. As shown in FIG. 8, at step 802 a service request can be received. The service request may be received from any of a prospective rider, a vehicle, the dispatch system, or any other entity in communication with the ride matching system. In various embodiments, the request may be made for a variety of services, such as a ride request, a maintenance request, a data gathering request, or other requested service.

At step 804, the request can be processed by a dispatch marketplace. As discussed, an autonomous dispatch system may process the request to identify the requestor, the requested service, location information, and other data related to the request and/or the requestor. For example, the request may include raw data collected by an autonomous vehicle (e.g., charge level, miles driven, etc.) This raw data may then be extracted from the request. One or more potential actions may then be determined based on the raw data (e.g., by comparing the raw data to one or more rules). For example, one or more service actions associated with the raw data may be determined.

Based on this data, at step 806, the request may be matched to a service provider based on one or more constraints and/or filters. For example, a maintenance request may be received from a vehicle and the dispatch system may determine the vehicle's location, the type of maintenance requested, and then match the vehicle to a service facility that can perform the requested maintenance. This match may vary as conditions change in real time. For example, at a first time, dispatch logic may match the vehicle to a nearby service facility based on current demand in the area where the vehicle is located and based on the expected time required to complete maintenance. However, at a second time, a more distant service facility may be matched. For example, the more distant service facility may be located in an area that is expected to have high demand when the maintenance is completed. Accordingly, the matches are performed dynamically, based on real time constraints, rather than mere location data. Additionally, the dispatch logic may weight different factors differently depending on the requesting vehicle, location, or other factors. At step 808, an autonomous vehicle can be dispatched based on the matched request. For example, a matched autonomous vehicle can be dispatched to a pickup location associated with a ride requestor. In some embodiments, the service requestor can be dispatched to a service provider. For example, an autonomous vehicle can be dispatched to the matched service provider, such as a maintenance facility. Although the above is described as occurring prior to the matching at step 808, in various embodiments, this may be performed prior to the matching, during the matching, or after the matching.

Figure 9:
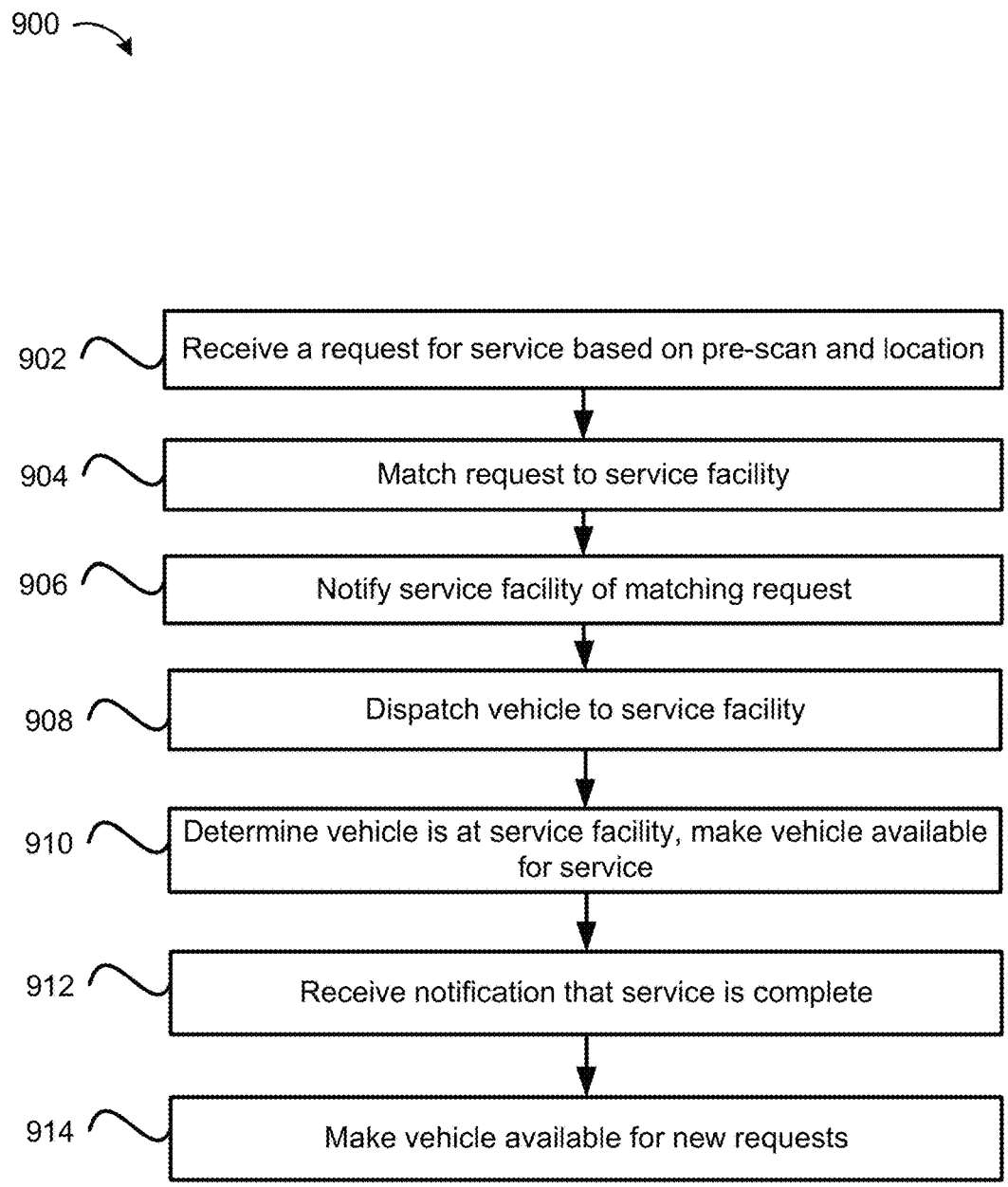
FIG. 9 illustrates an exemplary flow diagram of a method of dispatching a vehicle for service using a marketplace, in accordance with an embodiment.

FIG. 9 illustrates an exemplary flow diagram of a method of dispatching a vehicle for service using a dynamic transportation matching marketplace, in accordance with an embodiment. At step 902, a request for service may be received from an autonomous vehicle. The request for service may be made in response to a pre-scan conducted by the vehicle after a ride or other service has been completed. For example, a vehicle charge or fuel level may be determined to be low. The pre-scan may include a service check performed by the vehicle automatically or by a user, such as a rider, in the vehicle. The vehicle may enter a non-dispatchable state while it completes that check. Once the check is complete, the vehicle may enter a specific state for vehicle service (if service is required) or return to the dispatchable pool.

In some embodiments, an automated service check may include checking a fuel level at the end of each ride, and returning a value of the number of miles remaining before it requires a charge/refueling. If the number of miles is less than 2× the total of a maximum ride length (or other threshold value), a request to fuel the car may be sent. Similarly, sensors may be used to determine whether the vehicle requires cleaning, as well as time slot data to determine whether it is in a period of the day in which the vehicle should be parked. In some embodiments, a user may manually indicate that the vehicle requires cleaning or other service. For example, a user may be provided with an interface through which she may rate the cleanliness of the vehicle or may reject a ride based on vehicle cleanliness.

At step 904, a dispatch system can match the requesting vehicle to an available service facility. Each facility may be defined based on location and one or more services provided at the facility. In some embodiments, each facility may provide real time availability information indicating whether the facility is able to receive a vehicle for maintenance. In various embodiments, the match between the vehicle and the service facility may be determined based on the full fleet, for example, based on a cost of service at different times of day, the likely demand, etc.

At step 908, the vehicle can be dispatched to the matching facility for service. The ride can be dispatched as ride type of "service" and data related to travel time and service time may be monitored. At step 910, the dispatch system can determine the vehicle has arrived at the facility. The vehicle can indicate it has parked and that it is ready for service. The vehicle's status changes to "parked and ready for service."

Service may begin automatically or by a maintenance worker at the facility. Once service is complete, at step 912 a notification may be received and the vehicle status may be updated to "service complete." In some embodiments, some services may be performed automatically. For example, an automated charger or cleaning system may determine the vehicle is parked and ready for service. This may be based on vehicle status and/or location, as communicated from the vehicle via the autonomous matching service. At step 914 the vehicle may then be made available for new requests by being returned to the dispatch pool.

Figure 10:
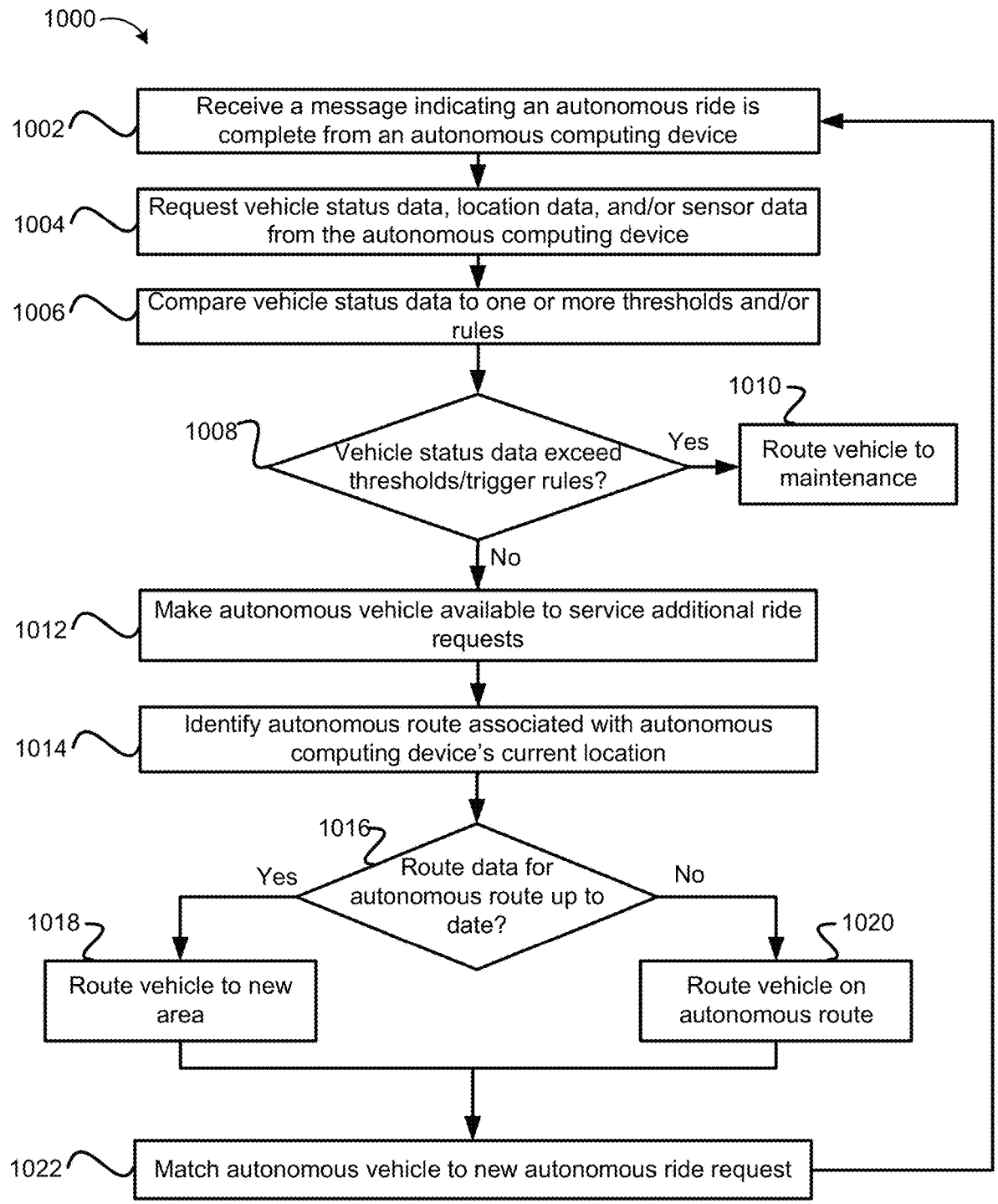
FIG. 10 illustrates an exemplary flow diagram of a method of autonomous vehicle management, in accordance with an embodiment.

FIG. 10 illustrates an exemplary flow diagram of a method 1000 of autonomous vehicle management, in accordance with an embodiment. In some embodiments, it may be determined that an autonomous ride has been completed. For example, at step 1002, a message indicating that an autonomous ride is complete can be received. In some embodiments, the message can be received from the autonomous vehicle upon completion of the ride. Additionally, or alternatively, a message from a requestor device may be received confirming the end of the ride.

At step 1004, autonomous ride data associated from the autonomous computing device can be requested. The autonomous ride data can include one or more of vehicle status data, location data, or sensor data. In some embodiments, autonomous ride data can be provided continuously (e.g., streamed) from the autonomous computing device or may be provided at regular intervals during a ride.

At step 1006, the vehicle status data can be compared to acceptability thresholds and/or rules. For example, the vehicle status data may indicate the number of miles driven, or drive time, of the autonomous vehicle since its last maintenance, and this value compared to a threshold value corresponding to the particular rule. Additionally, or alternatively, the vehicle status data may include vehicle maintenance codes, such as check engine codes, oil level/pressure codes, etc. At step 1008, it can be determined whether the vehicle status data exceeds the threshold and/or triggers the rule. If so, at step 1010, the autonomous vehicle can be instructed to follow a new autonomous route to a maintenance area. As discussed, the autonomous route may be selected based on available routes between the current location of the autonomous vehicle and the maintenance area, and how recently or frequently data has been collected from those available routes.

If the vehicle status data does not exceed the threshold or trigger a rule (e.g., a mileage value is within a mileage acceptability threshold), at step 1012 the autonomous vehicle can be made available to service additional autonomous ride requests. Until such a ride request is matched to the autonomous vehicle, the autonomous vehicle can be utilized as a data collection device. At step 1014, an autonomous route can be identified based on the autonomous ride data, such as a route to be traveled upon completion of the service request (e.g., ride request). For example, one or more autonomous routes can be identified based on the current location of the autonomous vehicle, as well as other criteria such as analysis of ride data from a dynamic transportation matching system using non-autonomous vehicles (e.g., driver-operated vehicles). For example, an autonomous matching service may be in communication with a dynamic transportation matching system in order to determine certain routes traveled historically by non-autonomous vehicles, such as popularity of routes, popular pick-up locations, popular drop-off locations, as well as sub-areas within a geographic area serviced by both non-autonomous vehicles and autonomous vehicles.

At step 1016, it can be determined whether route data associated with the identified route is up to date. For example, some routes may be more frequently traveled than others, leading to up to date information for some routes and stale information for others. If the route data associated with the autonomous route is determined to be up to date, at step 1018 the autonomous vehicle can be instructed to follow a second autonomous route to an autonomous pickup area. In some embodiments, the autonomous pickup area is determined based on time of day, recent request activity, or distance from designated autonomous pickup areas. If the route data associated with the autonomous route is determined to be out of date, at step 1020, the autonomous vehicle can be instructed to follow the autonomous route and collect autonomous ride data associated with the autonomous route.

At step 1022, the autonomous vehicle can be matched to an autonomous ride request. For example, while the autonomous vehicle is traveling the identified autonomous route, it can be matched to a new ride request. The autonomous vehicle can stop following the autonomous route and update its destination to be the pickup location associated with the autonomous ride request. In some embodiments, a drop-off location associated with the autonomous ride request can be received. A default route between the pickup location and the drop-off location can be determined, along with one or more alternative routes. As discussed, a requestor may select one of the routes and thereafter, the autonomous vehicle can be instructed to follow the selected route. In an embodiment, an autonomous matching service may be part of a dynamic transportation matching system, which may allow for autonomous as well as non-autonomous vehicles to be matched to service requests (e.g., ride requests, delivery requests, etc.). A new ride request may be received (e.g., at the dynamic transportation matching system) that indicates one or more criteria about the service request. For example, a pickup location, a drop-off location, a number of passengers, a preference for autonomous versus non-autonomous vehicles, etc. Various routes may be determined; for example, a route from a current location of a service provider (e.g., an autonomous vehicle, a non-autonomous vehicle, etc.) to a pickup location, a route from the pickup location to the drop-off/destination location, a route to a maintenance facility from one or more of the pickup/drop-off locations, etc. Once one or more routes associated with the service request are determined, it is evaluated whether the routes can be serviced by autonomous vehicles. For example, a pickup location may be associated with a street segment that is part of a zone that is off-limits to autonomous vehicles, such as based on local ordinances, traffic, road elevations, time of day, distance from maintenance and/or charging/refueling locations, etc. As discussed above, it may be determined whether route data for at least a portion of the determined routes is current or out-of-date. In an embodiment, an autonomous vehicle is dispatched to the service request, and is instructed to travel portions of a route that correspond to areas with out-of-date route data as part of completing the service request. In an embodiment, an autonomous vehicle may not be matched to the service request (e.g., a non-autonomous vehicle may be closer, have a lower ETA to the pickup and/or drop-off location, etc.), and a provider computing device associated with the non-autonomous vehicle may gather autonomous ride data for portions of the route that correspond to out-of-date route data. For example, the provider computing device may be in communication with sensors (e.g., in the computing device, in the vehicle, etc.) that are similar or identical to those used in an autonomous vehicle, or may use different sensors that gather data which is later transformed into a format sufficient for autonomous vehicles.

Figure 11:
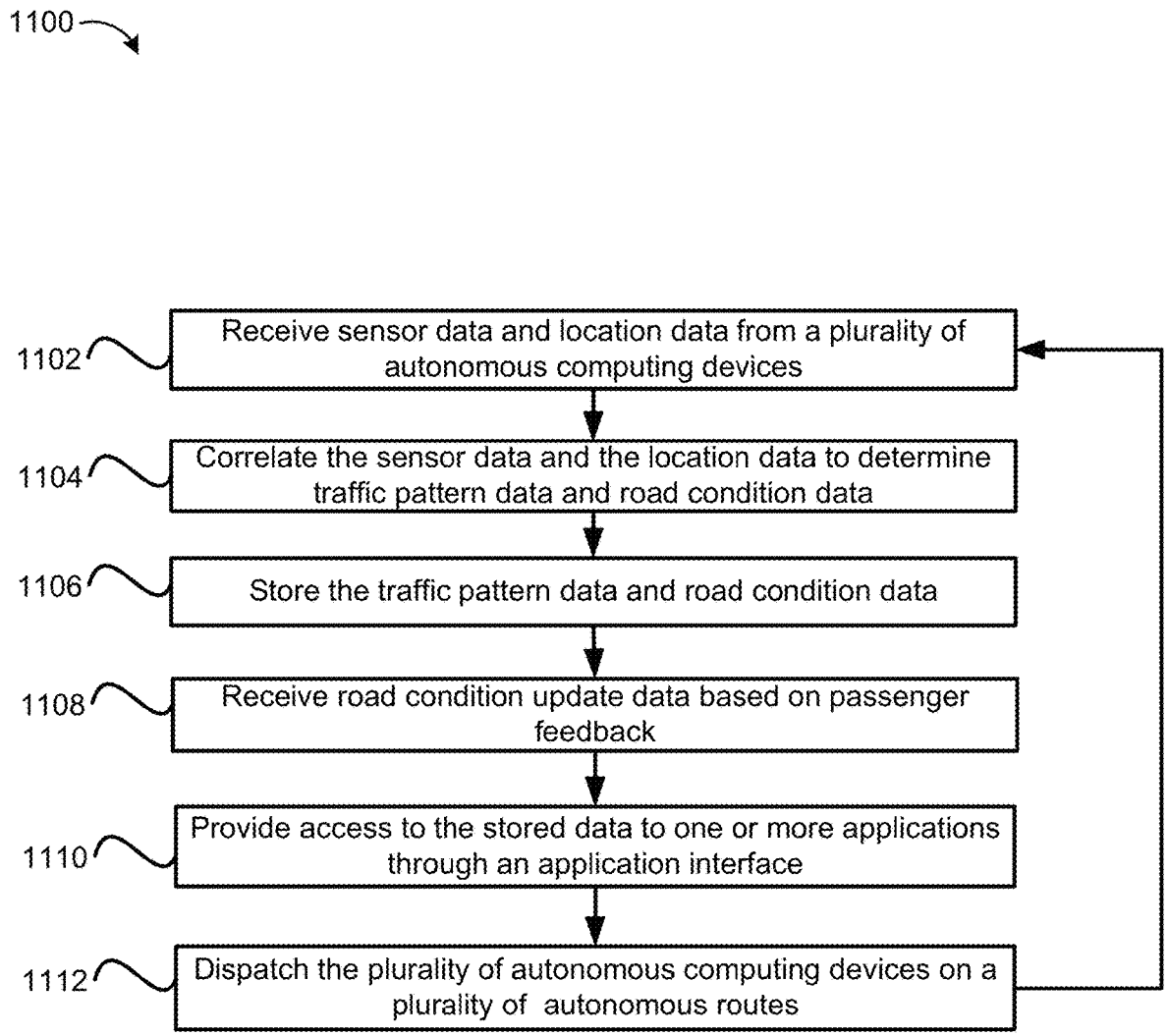
FIG. 11 illustrates an exemplary flow diagram of a method of collecting and correlating data using autonomous computing devices, in accordance with an embodiment.

FIG. 11 illustrates an exemplary flow diagram of a method 1100 of collecting and correlating data using autonomous computing devices, in accordance with an embodiment. At step 1102, autonomous ride data can be received from a plurality of autonomous computing devices. The autonomous ride data can include sensor data and location data collected by each of the plurality of autonomous computing devices. In some embodiments, the autonomous ride data may include vehicle status data, such as maintenance codes, vehicle usage, or other data.

At step 1104, traffic pattern data and road condition data can be determined based on the sensor data and the location data. As discussed, the traffic pattern data and road condition data can be determined by correlating location data and sensor data received from the autonomous computing devices. For example, traffic pattern data can be determined based on vehicle speed and location, while road condition data can be determined based on multi-axis accelerometer data and location. At step 1106, the traffic pattern data and the road condition data can be stored in an autonomous ride data store. In some embodiments, road condition update data can be received based on passenger feedback at step 1108. For example, a passenger may select one or more intersections, blocks, or other locations on a map displayed on an in-vehicle computing device and indicate that the selected location(s) should be avoided. At step 1110, access to the autonomous ride data store can be provided through an application interface.

In various embodiments, at step 1112 the plurality of autonomous computing devices can be sent on a plurality of autonomous routes. As discussed, as rides are completed and additional autonomous ride data is collected, the autonomous vehicles can be sent to gather additional data along various autonomous routes. These autonomous routes may be determined based on how recently data has been collected along these routes and/or how frequently data is collected along these routes.

In some embodiments, a request can be received from a third party application for the autonomous ride data store through the application interface. The autonomous ride data from the autonomous ride data store can be provided to the third party application. In some embodiments, the third party application, or a user thereof, can be authorized and or authenticated by the ride matching system before access to the autonomous ride data is granted.

As discussed, in some embodiments, autonomous computing devices can communicate directly with one another (e.g., by pairing, forming a mesh network, or other connection) to share data. For example, a first autonomous computing device can receive updated autonomous ride data from a second autonomous computing device. The autonomous ride matching system may receive this updated autonomous ride data from the second autonomous computing device, even if there is no connection between the first autonomous computing device and the autonomous ride matching system. The autonomous ride matching system may then update the autonomous ride data store based on the updated autonomous ride data.

Figure 12:
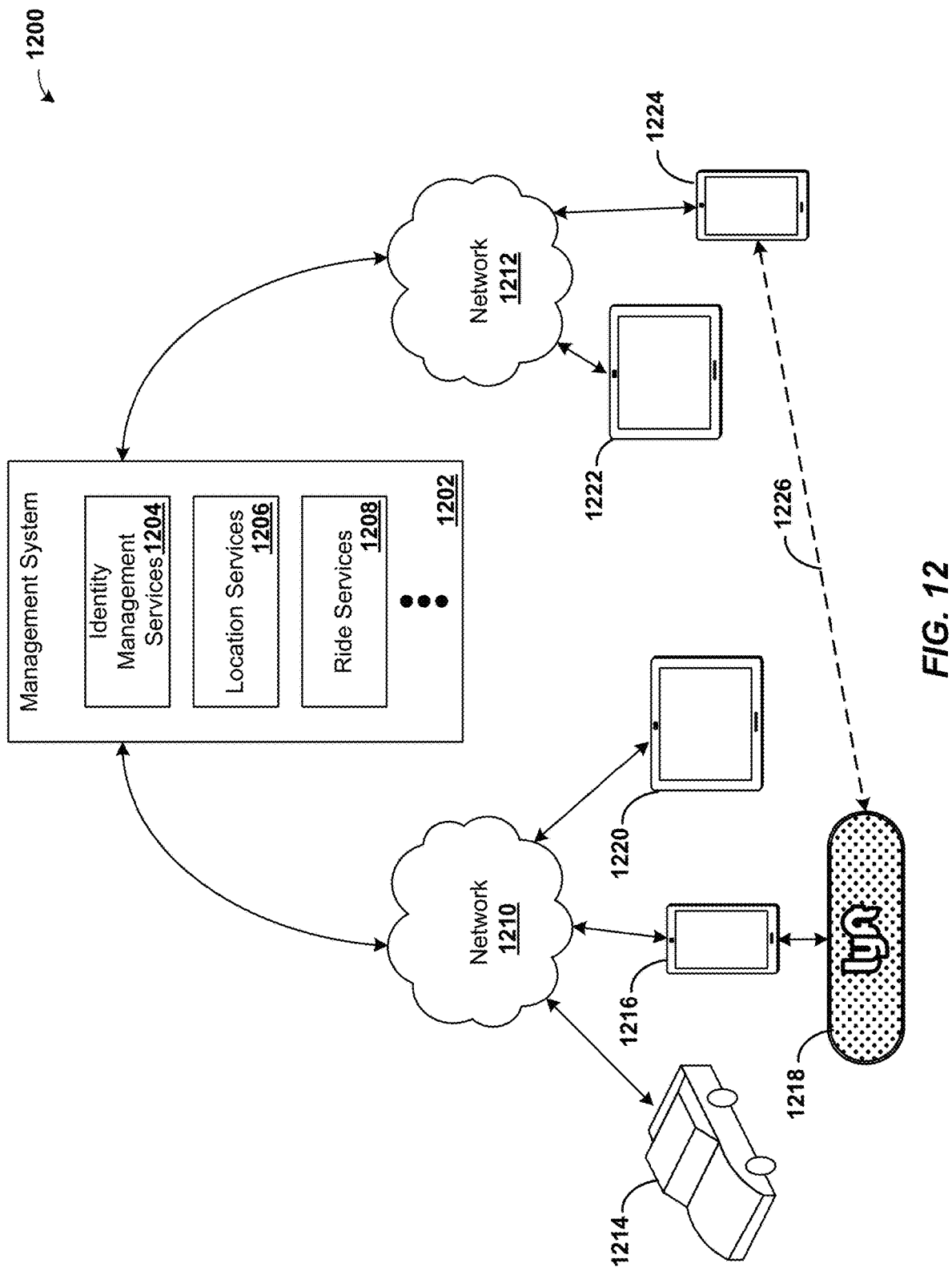
FIG. 12 illustrates an example requestor/provider management environment, in accordance with various embodiments.

FIG. 12 shows a requestor/provider management environment 1200, in accordance with various embodiments. As shown in FIG. 12, a management system 1202 can be configured to provide various services to requestor and provider devices. Management system 1202 can run one or more services or software applications, including identity management services 1204, location services 1206, ride services 1208, or other services. Although three services are shown as being provided by management system 1202, more or fewer services may be provided in various implementations. In various embodiments, management system 1202 may include one or more general purpose computers, server computers, clustered computing systems, cloud-based computing systems, or any other computing systems or arrangements of computing systems. Management system 1202 may be configured to run any or all of the services and/or software applications described with respect to various embodiments described herein. In some embodiments, management system 1202 can run any appropriate operating system as well as various server applications, such as common gateway interface (CGI) servers, JAVA® servers, hypertext transport protocol (HTTP) servers, file transfer protocol (FTP) servers, database servers, etc.

For example, identity management services 1204 may include various identity services, such as access management and authorization services for requestors and providers when interacting with management system 1202. This may include, e.g., authenticating the identity of providers and determining that the providers are authorized to provide services through management system 1202. Similarly, requestors' identities may be authenticated to determine whether the requestor is authorized to receive the requested services through management system 1202. Identity management services 1204 may also control access to provider and requestor data maintained by management system 1202, such as driving and/or ride histories, personal data, or other user data. Location services 1206 may include navigation and/or traffic management services and user interfaces, or other location services.

In various embodiments, ride services 1208 may include ride matching and management services to connect a requestor to a provider. Ride services 1208 may include a user interface and or may receive data from requestors and providers through applications executing on their respective devices. Ride services 1208 may, e.g., confirm the identity of requestors and providers using identity management services 1204, and determine that each user is authorized for the requested ride service. In some embodiments, ride services 1208 can identify an appropriate provider using a location obtained from a requestor and location services 1206 to identify, e.g., a closest provider. As such, ride services 1208 can manage the distribution and allocation of provider and requestor resources, consistent with embodiments described herein. For example, ride services may manage the distribution and allocation of non-autonomous vehicles and/or autonomous vehicles, such as within a dynamic transportation matching system.

Management system 1202 can connect to various devices through network 1210 and 1212. Networks 1210, 1212 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1210, 1212 can include local area networks (LAN), such as Ethernet, Token-Ring or other LANs. Networks 1210, 1212 can include a wide-area network and/or the Internet. In some embodiments, networks 1210, 1212 can include VPNs (virtual private networks), PSTNs (a public switched telephone networks), infra-red networks, or any wireless network, including networks implementing the IEEE 1202.11 family of standards, Bluetooth®, Bluetooth® Low Energy, NFC and/or any other wireless protocol. In various embodiments, networks 1210, 1212 can include a mobile network, such as a mobile telephone network, cellular network, satellite network, or other mobile network. Networks 1210, 1212 may be the same as communication network 170 in FIG. 1. In some embodiments, networks 1210, 1212 may each include a combination of networks described herein or other networks as are known to one of ordinary skill in the art.

Users may then utilize one or more services provided by management system 1202 using applications executing on provider and requestor devices. As shown in FIG. 12, provider computing devices 1214, 1216, 1218, and/or 1220 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1210, 1212. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1214 can include a vehicle-integrated computing device, such as a vehicle navigation system, or other computing device integrated with the vehicle itself.

In some embodiments, provider computing device 1218 can include a provider communication device configured to communicate with users, such as drivers, passengers, pedestrians, and other users. In some embodiments, provider communication device 1218 can communicate directly with management system 1202 or through another provider computing device, such as provider computing device 1216. In some embodiments, a requestor computing device can communicate 1226 directly with provider communication device 1218 over a peer-to-peer connection, Bluetooth connection, NFC connection, ad hoc wireless network, or any other communication channel or connection. Although particular devices are shown as communicating with management system 1202 over networks 1210 and 1212, in various embodiments, management system 1202 can expose an interface, such as an application programming interface (API) or service provider interface (SPI) to enable various third parties which may serve as an intermediary between end users and management system 1202.

Although requestor/provider management environment 1200 is shown with four provider devices and two requestor devices, any number of devices may be supported. The various components shown and described herein may be implemented in hardware, firmware, software, or combinations thereof. Although one embodiment of a requestor/provider management environment is depicted in FIG. 12, this is merely one implementation and not meant to be limiting.

Figure 13:
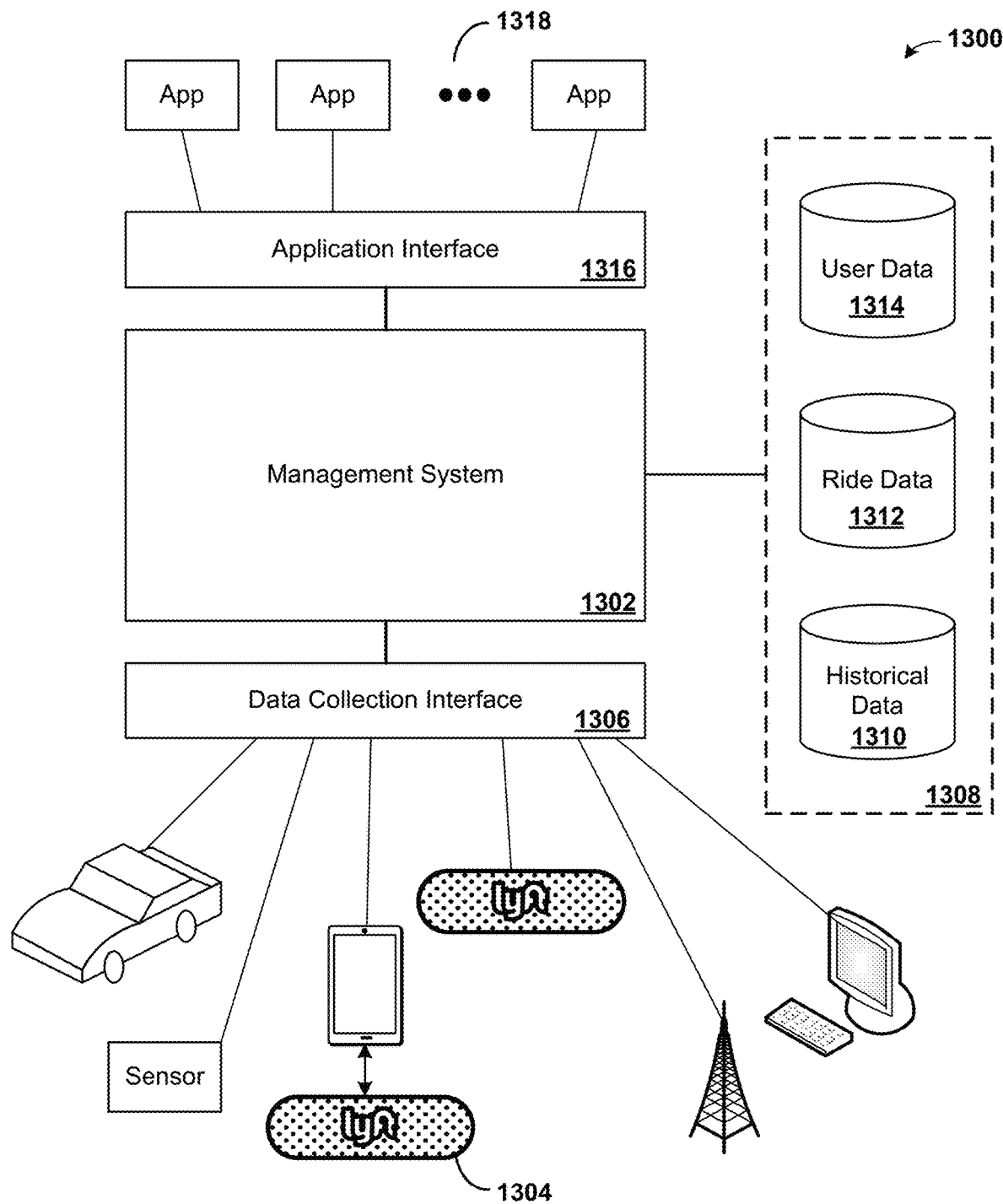
FIG. 13 illustrates an example data collection and application management system, in accordance with various embodiments.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 can be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 can include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although particular data stores are shown, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 can run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

Although a particular implementation of environment 1300 is shown in FIG. 13, this is for illustration purposes only and not intended to be limited. In some embodiments, environment 1300 may include fewer or more components, as would be recognized by one or ordinary skill in the art.

Figure 14:
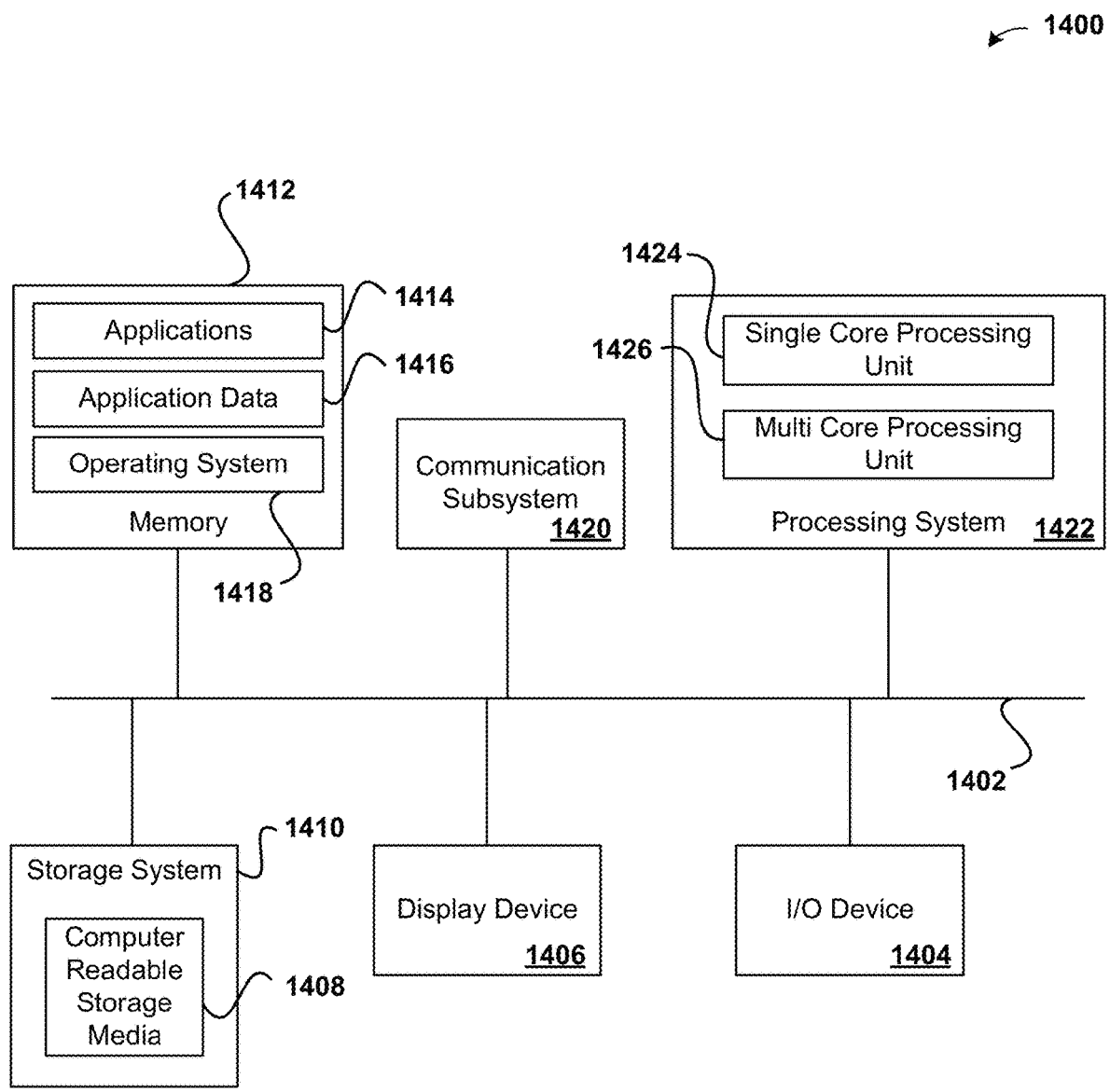
FIG. 14 illustrates an example computer system, in accordance with various embodiments.

FIG. 14 shows an example computer system 1400, in accordance with various embodiments. In various embodiments, computer system 1400 may be used to implement any of the systems, devices, or methods described herein. In some embodiments, computer system 1400 may correspond to any of the various devices described herein, including, but not limited, to mobile devices, tablet computing devices, wearable devices, personal or laptop computers, vehicle-based computing devices, or other devices or systems described herein. As shown in FIG. 14, computer system 1400 can include various subsystems connected by a bus 1402. The subsystems may include an I/O device subsystem 1404, a display device subsystem 1406, and a storage subsystem 1410 including one or more computer readable storage media 1408. The subsystems may also include a memory subsystem 1412, a communication subsystem 1420, and a processing subsystem 1422.

In system 1400, bus 1402 facilitates communication between the various subsystems. Although a single bus 1402 is shown, alternative bus configurations may also be used. Bus 1402 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1402 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1404 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1404 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1400 may include a display device subsystem 1406. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1406 may include a controller and/or interface for controlling and/or communicating with an external display, such as any of the above-mentioned display technologies.

As shown in FIG. 14, system 1400 may include storage subsystem 1410 including various computer readable storage media 1408, such as hard disk drives, solid state drives (including RAM-based and/or flash-based SSDs), or other storage devices. In various embodiments, computer readable storage media 1408 can be configured to store software, including programs, code, or other instructions, that is executable by a processor to provide functionality described herein. In some embodiments, storage system 1410 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1410 can include a media reader, card reader, or other storage interface to communicate with one or more external and/or removable storage devices. In various embodiments, computer readable storage media 1408 can include any appropriate storage medium or combination of storage media. For example, computer readable storage media 1408 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be transmitted and/or received.

Memory subsystem 1412 can include various types of memory, including RAM, ROM, flash memory, or other memory. Memory 1412 can include SRAM (static RAM) or DRAM (dynamic RAM). In some embodiments, memory 1412 can include a BIOS (basic input/output system) or other firmware configured to manage initialization of various components during, e.g., startup. As shown in FIG. 14, memory 1412 can include applications 1414 and application data 1416. Applications 1414 may include programs, code, or other instructions, that can be executed by a processor. Applications 1414 can include various applications such as browser clients, location management applications, ride management applications, data management applications, and any other application. Application data 1416 can include any data produced and/or consumed by applications 1414. Memory 1412 can additionally include operating system 1418, such as macOS®, Windows®, Linux®, various UNIX® or UNIX- or Linux-based operating systems, or other operating systems.

System 1400 can also include a communication subsystem 1420 configured to facilitate communication between system 1400 and various external computer systems and/or networks (such as the Internet, a local area network (LAN), a wide area network (WAN), a mobile network, or any other network). Communication subsystem 1420 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 140 in FIG. 1. Additionally, or alternatively, communication subsystem 1420 can include hardware and/or software components to communicate with satellite-based or ground-based location services, such as GPS (global positioning system). In some embodiments, communication subsystem 1420 may include, or interface with, various hardware or software sensors. The sensors may be configured to provide continuous or and/or periodic data or data streams to a computer system through communication subsystem 1420

As shown in FIG. 14, processing system 1422 can include one or more processors or other devices operable to control computing system 1400. Such processors can include single core processors 1424, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1422, such as processors 1424 and 1426, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    detecting that route data for a route area is out of date based on a collection time associated with the route data;
    determining, based on the route data for the route area being out of date, that at least one vehicle is to be instructed to collect updated route data for the route area;
    identifying an autonomous vehicle to collect the updated route data for the route area;
    determining an autonomous route for the autonomous vehicle to travel along, wherein at least a portion of the route area is included within the autonomous route; and
    instructing the autonomous vehicle to travel along the autonomous route, causing the autonomous vehicle to collect the updated route data for the route area while travelling along the autonomous route.

2. The computer-implemented method of claim 1, wherein detecting that the route data for the route area is out of date comprises:
    determining, based on the collection time associated with the route data, that the route data for the route area is less frequently collected relative to route data collected for another route area.

3. The computer-implemented method of claim 1, wherein detecting that the route data for the route area is out of date comprises:
    determining, based on the collection time associated with the route data, that the route data for the route area is less recently updated than route data collected for another route area.

4. The computer-implemented method of claim 1, wherein the route data for the route area comprises information collected as one or more vehicles traveled the route area.

5. The computer-implemented method of claim 1, wherein the route data comprises one or more of:
   traffic information;
   road condition information; or
   weather information.

6. The computer-implemented method of claim 5, wherein the road condition information comprises:
   a measurement of a road condition made by a multi-axis accelerometer of a vehicle or a multi-axis gyroscope of a vehicle; or
   a report of a road condition received from a passenger of a vehicle.

7. The computer-implemented method of claim 1, further comprising:
   determining a second autonomous route that is outside of the route area; and
   wherein instructing the autonomous vehicle to travel along the autonomous route, causing the autonomous vehicle to collect the updated route data for the route area while travelling along the autonomous route comprises selecting the autonomous route instead of the second autonomous route for the autonomous vehicle to travel along based on the route area being at least partially within the autonomous route.

8. The computer-implemented method of claim 1, wherein identifying the autonomous vehicle to collect the updated route data for the route area comprises:
   receiving autonomous ride data from an autonomous computing device associated with the autonomous vehicle, wherein the autonomous ride data comprises status data and location data;
   determining, based on the status data, that the autonomous vehicle is available to collect the updated route data; and
   identifying a current location of the autonomous vehicle based on the location data of the autonomous vehicle.

9. The computer-implemented method of claim 1, wherein determining that the at least one vehicle is to be instructed to collect the updated route data for the route area is based at least on a dispatch cost associated with travel to the route area.

10. The computer-implemented method of claim 9, wherein the dispatch cost is determined based at least in part on a probability that travelling along the autonomous route will position the autonomous vehicle for a ride request.

11. The computer-implemented method of claim 1, wherein determining that the at least one vehicle is to be instructed to collect the updated route data for the route area is further based on:
   a frequency of use of the route area;
   an indication of a previous time of when the updated route data for the route area was collected;
   a likelihood that the route area will be traveled by another vehicle; or
   detecting that a vehicle is available to service a ride request.

12. The computer-implemented method of claim 1, wherein the autonomous route for the autonomous vehicle to travel along is capable of being navigated by the autonomous vehicle and positions the autonomous vehicle in the route area to collect the updated route data for the route area.

13. An autonomous dispatch system comprising:
   at least one processor; and
   a non-transitory computer-readable medium comprising code, which when executed by the at least one processor, causes the autonomous dispatch system to:
      detect that route data for a route area is out of date based on a collection time associated with the route data;
      determine, based on the route data for the route area being out of date, that at least one vehicle is to be instructed to collect updated route data for the route area;
      identify an autonomous vehicle to collect the updated route data for the route area;
      determine an autonomous route for the autonomous vehicle to travel along, wherein at least a portion of the route area is included within the autonomous route; and
   instruct the autonomous vehicle to travel along the autonomous route, causing the autonomous vehicle to collect the updated route data for the route area while travelling along the autonomous route.

14. The autonomous dispatch system of claim 13, wherein the code that causes the autonomous dispatch system to detect that the route data for the route area is out of date further causes the autonomous dispatch system to:
   determine, based on the collection time associated with the route data, that the route data for the route area is less frequently collected relative to route data collected for another route area.

15. The autonomous dispatch system of claim 13, wherein the code that causes the autonomous dispatch system to detect that the route data for the route area is out of date further causes the autonomous dispatch system to:
   determine, based on the collection time associated with the route data, that the route data for the route area is less recently updated than route data collected for another route area.

16. The autonomous dispatch system of claim 13, wherein the route data for the route area comprises information collected as one or more vehicles traveled the route area.

17. A non-transitory computer readable medium comprising instructions that, when executed by at least one processor, cause a computer system to:
   detect that route data for a route area is out of date based on a collection time associated with the route data;
   determine, based on the route data for the route area being out of date, that at least one vehicle is to be instructed to travel to the route area to collect updated route data for the route area;
   identify an autonomous vehicle to collect the updated route data for the route area;
   determine an autonomous route for the autonomous vehicle to travel along, wherein at least a portion of the route area is included within the autonomous route; and
   instruct the autonomous vehicle to travel along the autonomous route, causing the autonomous vehicle to collect the updated route data for the route area while travelling along the autonomous route.

18. The non-transitory computer readable medium of claim 17, wherein the instructions that cause the computer system to detect that the route data for the route area is out of date further cause the computer system to:
   determine, based on the collection time associated with the route data, that the route data for the route area is less frequently collected relative to route data collected for another route area.

19. The non-transitory computer readable medium of claim 17, wherein the instructions that cause the computer system to detect that the route data for the route area is out of date further cause the computer system to:
    determine, based on the collection time associated with the route data, that the route data for the route area is less recently updated than route data collected for another route area.

20. The non-transitory computer readable medium of claim 17, wherein the route data for the route area comprises information collected as one or more vehicles traveled the route area.

* * * * *